(12) United States Patent
Iida

(10) Patent No.: US 10,509,305 B2
(45) Date of Patent: *Dec. 17, 2019

(54) LIGHT SOURCE CONTROL APPARATUS, LIGHT SOURCE CONTROL METHOD, AND PROJECTOR

(71) Applicant: SONY CORPORATION, Tokyo (JP)

(72) Inventor: Michihiko Iida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,175

(22) Filed: Nov. 16, 2018

(65) Prior Publication Data

US 2019/0086781 A1 Mar. 21, 2019

Related U.S. Application Data

(63) Continuation of application No. 15/565,989, filed as application No. PCT/JP2016/001746 on Mar. 25, 2016, now Pat. No. 10,168,607.

(30) Foreign Application Priority Data

Apr. 30, 2015 (JP) .................................. 2015-092552
Aug. 5, 2015 (JP) .................................. 2015-154780

(51) Int. Cl.
*G03B 21/20* (2006.01)
*H04N 9/31* (2006.01)
(Continued)

(52) U.S. Cl.
CPC ..... *G03B 21/2053* (2013.01); *G03B 21/2013* (2013.01); *H04N 9/3155* (2013.01);
(Continued)

(58) Field of Classification Search
CPC ............ G03B 21/2013; G03B 21/2033; G03B 21/2053; H04N 9/3161; H04N 9/3164;
(Continued)

(56) References Cited

U.S. PATENT DOCUMENTS

2011/0069094 A1 3/2011 Knapp
2013/0329193 A1 12/2013 Tatsumi
(Continued)

FOREIGN PATENT DOCUMENTS

CN 102427644 A 4/2012
JP 2009-252573 A 10/2009
(Continued)

OTHER PUBLICATIONS

Notice of Allowance and Fees Due for U.S. Appl. No. 15/565,989, dated Aug. 13, 2018, 09 pages.
(Continued)

*Primary Examiner* — Sultan Chowdhury
(74) *Attorney, Agent, or Firm* — Chip Law Group

(57) ABSTRACT

A light source control apparatus includes a controller, and a plurality of drivers. The controller transmits an instruction value for adjusting a light amount of at least one light emitting unit. Each of the plurality of drivers obtains the transmitted instruction value, and determines, by using a function of a driving value for driving the light emitting unit and the light amount, the function being each set for the light emitting unit, the driving value of the light emitting unit each on the basis of the instruction value.

14 Claims, 13 Drawing Sheets

(51) Int. Cl.
*H05B 37/02* (2006.01)
*H05B 33/08* (2006.01)

(52) U.S. Cl.
CPC ......... *H04N 9/3161* (2013.01); *H04N 9/3164* (2013.01); *H04N 9/3194* (2013.01); *H05B 33/086* (2013.01); *H05B 37/0209* (2013.01)

(58) Field of Classification Search
CPC ............ H05B 33/0845; H05B 33/0854; H05B 33/0815; H05B 33/0863; H05B 33/0803
See application file for complete search history.

(56) References Cited

U.S. PATENT DOCUMENTS

| | | | |
|---|---|---|---|
| 2014/0084889 A1 | 3/2014 | Kuroiwa et al. | |
| 2014/0176618 A1 | 6/2014 | Lee | |
| 2014/0192331 A1 | 7/2014 | Toyooka | |
| 2014/0225518 A1 | 8/2014 | Gyoten | |
| 2014/0293245 A1* | 10/2014 | Tani | G03B 21/2053 353/85 |
| 2016/0044757 A1 | 2/2016 | Koo | |

FOREIGN PATENT DOCUMENTS

| | | |
|---|---|---|
| JP | 2012-227013 A | 11/2012 |
| JP | 2013-175676 A | 9/2013 |
| JP | 2014-064436 A | 4/2014 |
| JP | 2014-179594 A | 9/2014 |
| WO | 2011/086682 A1 | 7/2011 |
| WO | 2012/164788 A1 | 12/2012 |

OTHER PUBLICATIONS

Non-Final Rejection for U.S. Appl. No. 15/565,989, dated Mar. 16, 2018, 09 pages.
International Search Report and Written Opinion of PCT Application No. PCT/JP2016/001746, dated Jun. 28, 2016, 11 pages of English Translation and 09 pages of ISRWO.
International Preliminary Report on Patentability of PCT Application No. PCT/JP2016/001746, dated Nov. 9, 2017, 11 pages of English Translation and 07 pages IPRP.

* cited by examiner

LIGHT SOURCE CONTROL APPARATUS, LIGHT SOURCE CONTROL METHOD, AND PROJECTOR

CROSS-REFERENCE TO RELATED APPLICATIONS

The present application is a continuation application of U.S. patent application Ser. No. 15/565,989, filed Oct. 12, 2017, which is a National Stage Entry of PCT/JP2016/001746, filed Mar. 25, 2016, and claims the benefit of priority from prior Japanese Patent Application 2015-154780 filed in the Japan Patent Office on Aug. 5, 2015, and Japanese Patent Application 2015-092552 filed in the Japan Patent Office on Apr. 30, 2015, the entire contents of which are hereby incorporated by reference.

TECHNICAL FIELD

The present technology relates to a projector, a light source control apparatus for controlling a light source of the projector, and a light source control method.

BACKGROUND ART

Patent Literature 1 discloses a driver circuit that drives light emitting diodes. The driver circuit includes: light emitting units, each group of the light emitting units including six light emitting diodes connected in series; a plurality of drivers, each of the plurality of drivers driving a plurality of groups, each of the plurality of groups including a plurality of light emitting units; and one driver control IC chip that controls the plurality of drivers. Specifically, the driver control IC chip outputs target current value signals for controlling the light emitting units to emit light and adjustment instruction signals to to the respective drivers. When each driver receives an adjustment instruction, each driver adjusts the current by using a voltage adjusting circuit such that the current flowing in the light emitting units reaches the target current value. Because the drivers execute adjustment in a temporally overlapping manner, the time until all the respective drivers finish adjustment is shortened (for example, see Patent Literature 1, specification, paragraphs, and, and FIGS. 1, 3, and 4).

CITATION LIST

Patent Literature

Patent Literature 1: Japanese Patent Application Laid-open No. 2013-175676

DISCLOSURE OF INVENTION

Technical Problem

In the driver circuit of Patent Literature 1, the plurality of drivers drive the plurality of light emitting units, respectively. According to this mode, the driving currents and the light amounts corresponding to the driving currents may be different sometimes depending on individual differences of the light emitting units. In this case, in order to adjust the light amounts of the light emitting units to make them uniform, it is necessary for a controller unit to generate different instruction values for the respective drivers, and it is thus difficult to adjust the light amount fast. Further, for example, there is known a method of mechanically adjusting a light amount by using an iris. However, there is a limitation to adjust a light amount fast by using a mechanical means.

In view of the above-mentioned circumstances, it is an object of the present technology to provide a light source control apparatus capable of adjusting a light amount fast, a light source control method, and a projector using them.

Solution to Problem

To attain the above-mentioned object, according to the present technology, a light source control apparatus includes a controller, and a plurality of drivers.

The controller is configured to transmit an instruction value for adjusting a light amount of at least one light emitting unit.

Each of the plurality of drivers is configured to obtain the transmitted instruction value, and to determine, by using a function of a driving value for driving the light emitting unit and the light amount, the function being each set for the light emitting unit, the driving value of the light emitting unit each on the basis of the instruction value.

The controller transmits the instruction value, and thereby each of the plurality of drivers determines a driving value by using a predetermined function. Therefore it is possible to adjust the light amount fast.

Each driver of the plurality of drivers may be configured to use, as the function, a function approximated by a straight line.

Therefore it is possible to reduce the calculation amount of the drivers, and the light amount may be adjusted faster.

Each driver of the plurality of drivers may be configured to use, as the function, a plurality of functions set corresponding to a plurality of driving regions, respectively.

Therefore the light amount is adjusted more accurately.

Each driver of the plurality of drivers may be configured to use, as the function approximated by a straight line, functions approximated by straight lines in a plurality of linear regions set corresponding to a plurality of driving regions, respectively.

Therefore the light amount is adjusted more accurately, and, in addition, the calculation amount of the drivers may be reduced as much as possible.

Each driver of the plurality of drivers may be configured to use the function with known parameters, the known parameters including an inclination of the straight line, a reference light amount, and a reference driving value corresponding to the reference light amount.

Each driver of the plurality of drivers may be configured to obtain from the controller or prestore a calculated value based on the inclination of the straight line and the reference light amount out of the known parameters.

Therefore the calculation amount at the time of adjusting the light amount is reduced, and the light amount may be adjusted faster. To prestore means to prestore before adjusting the light amount.

The controller may be configured to update the function on the basis of a predetermined condition.

Therefore, even if the light emitting units deteriorate over time or over years, the light amount may be adjusted accurately.

The plurality of drivers may include a plurality of first wavelength band light-emitting drivers, and a plurality of second wavelength band light-emitting drivers.

Each of the plurality of first wavelength band light-emitting drivers is configured to drive a plurality of light emitting units that emit light having a first wavelength band out of the at least one light emitting unit.

Each of the plurality of second wavelength band light-emitting drivers is configured to drive a plurality of light emitting units that emit light having a second wavelength band different from the first wavelength band out of the at least one light emitting unit.

Further, the controller may be configured to transmit a first instruction value to each of the plurality of first wavelength band light-emitting drivers, and to transmit a second instruction value to each of the plurality of second wavelength band light-emitting drivers.

Therefore, even in a mode in which the light emitting units emit light of two or more colors, it is possible to adjust the light amount fast.

The plurality of drivers may include a first driver and a second driver.

The first driver is configured to generate a voltage between a reference potential of a reference line and a potential of a first line higher than the reference potential, and to drive the first light emitting unit connected between the reference line and the first line, the first driver being connectable to the reference line and the first line.

The second driver is configured to generate a voltage between the reference potential and a potential of a second line lower than the reference potential, and to drive the second light emitting unit connected between the reference line and the second line, the second driver being connectable to the reference line and the second line.

Since the second driver generates a voltage at a potential lower than the reference potential, the sum of the current flowing into a controller board including the controller, the first driver, and the second driver via the reference line is reduced. In other words, since the current flowing into the controller board via the reference line is reduced, generation of a potential difference based on the reference line pattern of the controller board may be reduced. Therefore generation of a common-mode noise may be reduced. In this specification, "connection" means electric connection.

Each of the first driver and the second driver may be configured to use a potential of 0 volts as the reference potential.

Since the reference potential is 0 V, the design of the circuit of each driver may be simple.

A constant potential may be set as the reference potential, and the second driver may be configured to adjust a potential lower than the reference potential to adjust the driving value.

Since the potential lower than the reference potential is adjusted, troubles of the second drivers and the other circuits are reduced and safety is increased, which are advantageous effects.

The first driver may be configured to adjust a potential higher than the reference potential to adjust the driving value.

The light source control apparatus may further include a switcher unit that switches connection targets of the first light emitting unit such that an anode of the first light emitting unit is connected to the reference line and a cathode of the first light emitting unit is connected to the second line.

As a result, even if some of the light emitting units are in trouble, it is easy to control the light source unit, and generation of illuminance unevenness may be prevented.

Similarly, the light source control apparatus may further include a switcher unit that switches connection targets of the second light emitting unit such that a cathode of the second light emitting unit is connected to the reference line and an anode of the second light emitting unit is connected to the first line.

The light source control apparatus may further include a resistor element provided on at least one of a line connected to the controller and a line connected to the plurality of drivers out of the reference line.

As a result, the return current is converted into thermal energy by the resistor element, and therefore the value of the return current flowing into the controller and the plurality of drivers may be reduced.

Each driver of the plurality of drivers may be configured to use, as the function, a function of an average light amount, the average light amount being obtained by dividing a total light amount of the plurality of light emitting units corresponding to driving values by the number of the light emitting units.

Each driver of the plurality of drivers may be configured to use switch start timing of the driving value based on the instruction value, the switch start timings of the plurality of drivers being different from each other.

Delay time may be set for the switch start timing of the driving value of at least one of the respective drivers.

Each driver of the plurality of drivers may be configured to selectively use the plurality of different switch start timings depending on a change amount of the driving values before and after switching the driving value.

According to the present technology, a light source control method includes transmitting, by a controller, an instruction value for adjusting a light amount of at least one light emitting unit.

The method further includes obtaining, by each of a plurality of drivers, the transmitted instruction value.

The method further includes determining, by each of the plurality of drivers, by using a function of a driving value for driving the light emitting unit and the light amount, the function being each set for the light emitting unit, the driving value of the light emitting unit each on the basis of the instruction value.

According to another embodiment of the present technology, a light source control apparatus includes the first driver, the second driver, and a controller unit.

The controller unit is connectable to the reference line, the first driver, and the second driver, the controller unit being configured to control the first driver and the second driver.

Since the second driver generates a voltage at a potential lower than the reference potential, the sum of the current flowing into the controller unit, the first driver, and the second driver via the reference line is reduced. In other words, since the current flowing into the controller unit via the reference line is reduced, generation of a potential difference based on the reference line pattern of the controller unit may be reduced. Therefore generation of a common-mode noise may be reduced.

According to an embodiment of the present technology, a driver unit includes the first driver, and the second driver.

According to the present technology, a light source unit includes a first light emitting unit, and a second light emitting unit.

The first light emitting unit is connected between a reference line and a first line, the first light emitting unit being driven by a current generated by a voltage between a reference potential of the reference line and a potential of the first line higher than the reference potential.

The second light emitting unit is connected between the reference line and a second line, the second light emitting unit being driven by a current generated by a voltage between the reference potential of the reference line and a potential of the second line lower than the reference potential.

According to the present technology, a projector includes a plurality of light emitting units, a light modulation device that modulates light from the plurality of light emitting units, a projection optical system that projects modulated light obtained by modulating the light by the light modulation device, and the light source control apparatus. In the projector, the plurality of light emitting units may include a first light emitting unit connected between a reference line and a first line, and a second light emitting unit connected between the reference line and a second line. The plurality of drivers may include the first driver and the first driver.

According to another embodiment of the present technology, a projector includes the plurality of light emitting units, the light modulation device, the projection optical system, the driver unit, and the controller unit.

Advantageous Effects of Invention

As described above, according to the present technology, it is possible to adjust the light amount of the light emitting units fast.

Note that the above-mentioned effects are not necessarily limitations, but any effect described in the present disclosure may be obtained.

MODE(S) FOR CARRYING OUT THE INVENTION

Hereinafter, embodiments of the present technology will be described with reference to the drawings.

1. Configuration of Light Source Control Apparatus

Figure 1:
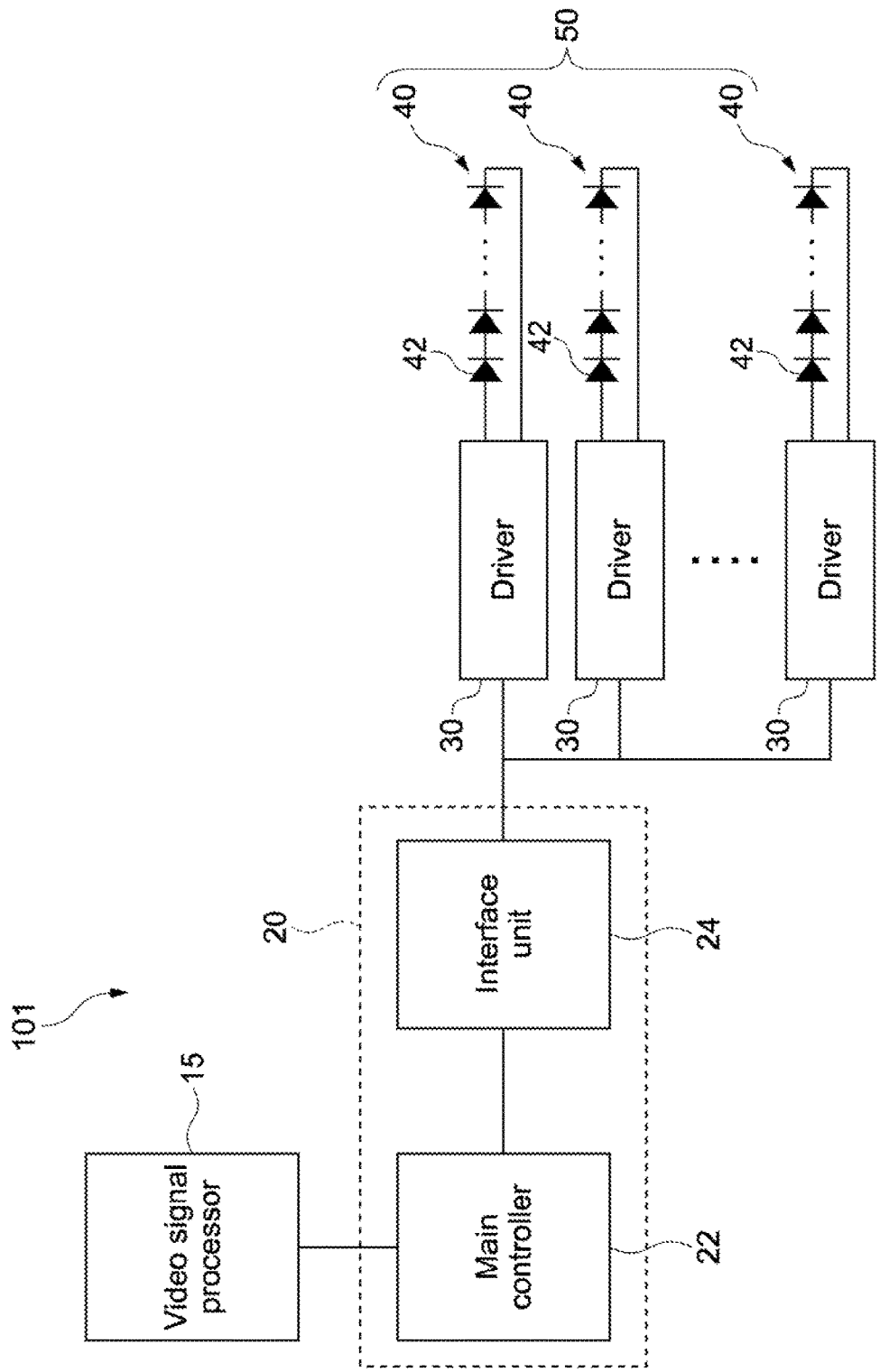
FIG. 1 is a block diagram showing a configuration of a light source control apparatus according to an embodiment of the present technology.

FIG. 1 is a block diagram showing a configuration of a light source control apparatus according to an embodiment of the present technology. The light source control apparatus 101 is, typically, an apparatus that drives a light source of a projector including a light modulation device such as a liquid crystal device. In this embodiment, an example of a light source control apparatus that receives an image signal (video signal) from the projector and controls light emission on the basis thereof will be described.

The light source control apparatus 101 includes the video signal processor 15, the controller 20, and the plurality of drivers 30. The light source (light source unit) 50 including the plurality of light emitting units 40 is electrically connected to the plurality of drivers 30.

The video signal processor 15 is, for example, a chip for processing a video signal, and processes a video signal input from, for example, an external apparatus (for example, PC) in various ways. Further, the video signal processor 15 is configured to transmit, for example, luminance data to the controller 20 as part of the video data.

The controller 20 includes, for example, the main controller 22 and the interface unit 24.

The main controller 22 mainly includes a CPU (Central Processing Unit) or an MPU (Micro Processing Unit), and includes a RAM (Random Access Memory), a ROM (Read Only Memory), and the like. The main controller 22 is configured to obtain the luminance data and the like output from the video signal processor 15.

Especially, the main controller 22 has a function of controlling the light amounts of the plurality of light emitting units 40 on the basis of the obtained luminance data by using a predetermined algorithm such that all the plurality of light emitting units 40 generate light having substantially the same brightness. Typically, the controller 20 is configured to control driving of the respective drivers 30 such that all the plurality of light emitting units 40 have substantially the same luminance for each one frame (or maybe a plurality of frames) of a video signal.

The predetermined algorithm is, for example, an algorithm for causing the light emitting units 40 to emit light having luminance having a grade of a predetermined number of bits depending on the total luminance of each frame. According to such an algorithm, for example, where an entire display is black, in order to minimize light that leaks from a liquid crystal device, relatively small luminance of all the plurality of light emitting units 40 is set. Note that, according to this algorithm, where the almost entire area of the display is black and the display partially has a relatively bright area, the luminance of all the plurality of light emitting units 40 is uniform and corresponds to the luminance of the relatively bright area. In other words, the luminance of all the plurality of light emitting units 40 is adjusted such that the highest luminance value may be reproduced out of the luminance values of all the pixels of image data input in a projector. In this manner, by transmitting an instruction value for adjusting the light amount of the light emitting units on the basis of input image data, it is possible to reduce the light amount of the light emitting units where the entire display is dim. Therefore it is possible to reduce power consumption of the light emitting units 40 and extend the lifetime of the light emitting units 40. Further, the amount of light blocked by a liquid crystal device may be reduced, and the lifetime of the liquid crystal device may thus be longer.

The interface unit 24 includes a control board that receives an instruction value for adjusting a light amount output from the main controller 22 and broadcasts the instruction value to the respective drivers 30. As a standard of transferring from the main controller 22 to the interface unit 24, for example, UART (Universal Asynchronous Receiver Transmitter) is used, which realizes the system inexpensively. As a matter of course, another standard may be employed.

In this embodiment, the main controller 22 and the interface unit 24 are independent chips, but one chip may include the main controller 22 and the interface unit 24.

The driver 30 has a function of driving the light emitting unit 40. Each light emitting unit 40 is connected to each driver 30. The drivers 30 are connected to the interface unit 24 in parallel. For example, four to twenty drivers 30 and four to twenty light emitting units 40 are provided, but not limited to this range. One light emitting unit 40 includes the plurality of light emitting devices 42 connected in series. As the light emitting device 42, for example, an LD (Laser Diode) is used.

As a standard of the interface between the interface unit 24 and each driver 30, for example, I2C or SPI (Serial Peripheral Interface) is used. I2C has a function of the general call address, and is capable of selecting all the slaves where 0 is set for the slave address. As a result, if is possible to broadcast notification from the interface unit 24 to the respective drivers 30.

In SPI, an SS (Slave Select) signal is used. Where lines are connected to slaves one by one, the number of lines is large, the area for the number of lines is required for the board, and the ports for the number of lines are required for the master. For example, it is possible to broadcast a notification by defining an instruction for transmitting the ID number (corresponding to slave address) of a driver board including the drivers 30 and by selecting all the slaves.

Figure 2:
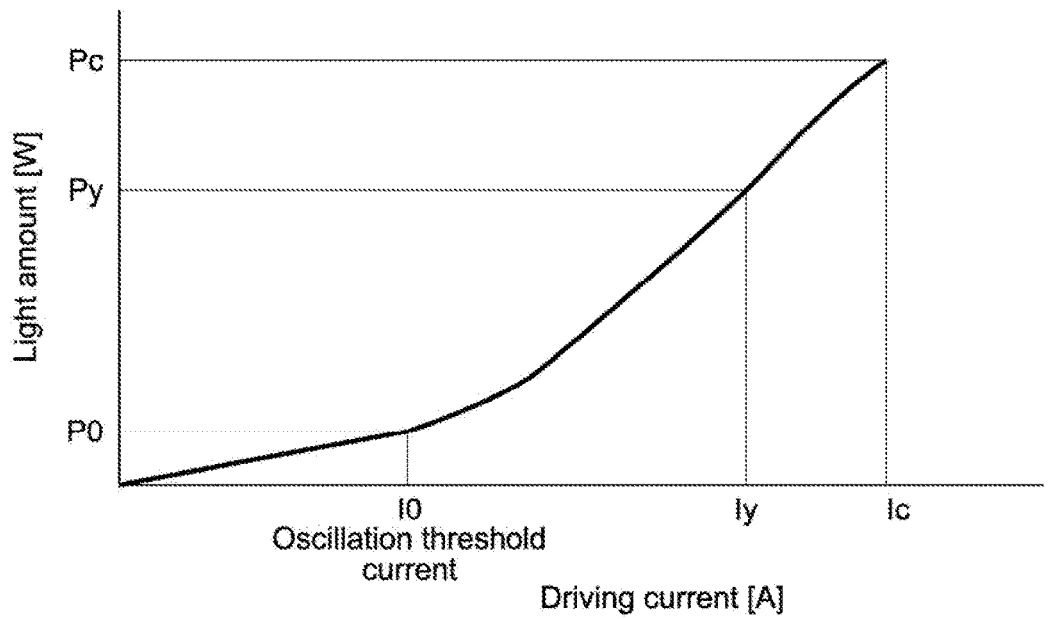
FIG. 2 is a graph showing a relation between a driving current, i.e., a driving value of the light emitting unit, and a light amount.

2. Principle of Light Emitting Control by Light Source Control Apparatus 2. 1) Relation Between Driving Value and Light Amount of Light Emitting Unit FIG. 2 is a graph showing a relation between a driving current ,i.e., a driving value of the light emitting unit 40, and a light amount. Here, as described above, a principle of light emitting control in order that all the plurality of light emitting units 40 may obtain substantially the same and uniform luminance will be described.

Each light emitting unit 40 has a relation shown in FIG. 2, and the relations (graphs) of the respective light emitting units 40 have substantially the same form.

However, the relations of the light emitting units 40 are slightly different from each other. As a matter of course, the relations of at least two light emitting units 40 out of all the light emitting units 40 may have no difference, and may have the relation between a driving current and a light amount having the same form.

With reference to FIG. 2, P0 is a light amount corresponding to the oscillation threshold current I0 of the light emitting devices 42 of the light emitting unit 40. The oscillation threshold current I0 is, specifically, a current value for generating the minimum light amount. Pc is a reference light amount and is the maximum light amount in this embodiment. Ic is a driving current as a reference driving value (reference driving current) for obtaining the reference light amount.

Py is a light amount corresponding to an arbitrary driving current Iy. The following Formula 0.1 using the function f shows the relation.

$$Py = f(Iy) \qquad \text{Formula 0.1}$$

The following Formula 0.2 shows Formula 0.1 by using the inverse function $f^{-1}$.

$$Iy = f^{-1}(Py) \qquad \text{Formula 0.2}$$

The following Formula 0.3 shows the change rate from the maximum light amount, i.e., the rate y (where $0 \leq y \leq 1$) of the target light amount with respect to the maximum light amount. Therefore Formula 0.4 is thus obtained.

$$y = Py/Pc \qquad \text{Formula 0.3}$$

$$Py = y*Pc \qquad \text{Formula 0.4}$$

The following Formula 0.5 is obtained on the basis of Formula 0.2 and Formula 0.4.

$$Iy = f^{-1}(y*Pc) \qquad \text{Formula 0.5}$$

For example, each driver 30 prestores the function (inverse function) $f^{-1}$ and Pc. The controller 20 broadcasts the instruction value y to the respective drivers 30, and the respective drivers 30 may thus calculate Iy individually by using Formula 0.5. In other words, each driver 30 may determine each driving current Iy on the basis of the instruction value y by using the function $f^{-1}$. As described above, since $f^{-1}$ of the light emitting units 40 may be slightly different from each other, the driving currents Iy of the respective drivers 30 may be different from each other even if the same instruction value y is used.

For example, each driver 30 may store, instead of $f^{-1}$ and Pc, a driving current data value defined by Formula 0.5 and the corresponding light amount data value in a look-up table style. Each driver 30 may have a volatile or non-volatile memory. For example, where each memory is a volatile memory, the controller 20 may prestore data of the functions $f^{-1}$ or data of the look-up tables. Further, at a time when the light source control apparatus 101 is powered on or at a predetermined time after that, the controller 20 may supply the functions $f^{-1}$ or the look-up tables to the respective drivers 30.

For example, where each driver 30 has a non-volatile memory, once the controller 20 transmits the data of the functions $f^{-1}$ or the data of the look-up tables to the drivers 30 and the respective drivers 30 obtain the data, each non-volatile memory may store the data after that. Alternatively, each non-volatile memory may prestore factory-configured data.

2. 2) Embodiment 1 (Example 1 of Specific Function)

Figure 3:
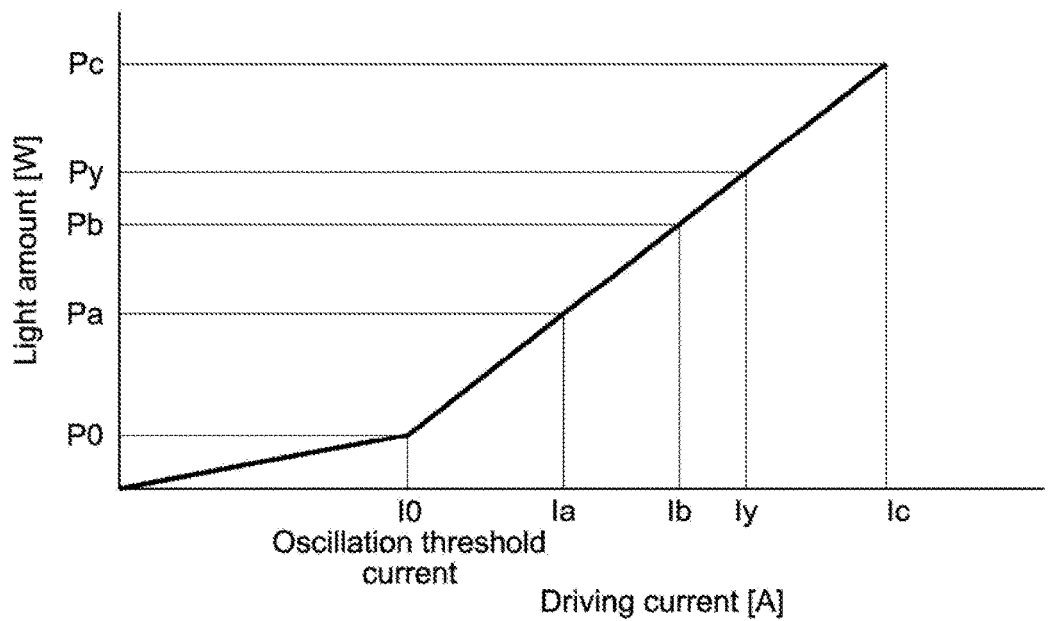
FIG. 3 is a graph showing the relation between the driving current and the light amount of an embodiment, in which a function is approximated by one straight line in the driving region of the oscillation threshold current or more.

Hereinafter, as a specific embodiment of the above-mentioned function f or $f^{-1}$, an example, in which the function is approximated by one straight line in the driving region of the oscillation threshold current I0 or more, will be described. FIG. 3 is a graph showing the relation between the driving current and the light amount of this embodiment.

In the graph of the present Embodiment 1, the function is approximated by a straight line in the driving region from the oscillation threshold current I0 to the reference driving current Ic corresponding to the maximum light amount Pc. As shown in the following Formula 1.1, k1 shows the inclination (Pb−Pa)/(Ib−Ia) of the straight line of the graph.

$$k1=(Pb-Pa)/(Ib-Ia) \qquad \text{Formula 1.1}$$

Formula 1.1 means Formula 1.2. In other words, as shown in Formula 1.3, Iy is represented by a function of Py.

$$Py-Pc=k1(Iy-Ic) \qquad \text{Formula 1.2}$$

$$Iy=f^{-1}(Py) \qquad \text{Formula 1.3}$$

Specifically, the following Formula 1.4 based on Formula 1.2 shows Iy.

$$Iy=(Py-Pc)/k1+Ic \qquad \text{Formula 1.4}$$

Where y=Py/Pc and 0≤y≤1, the following Formula 1.5 is derived on the bases of Formula 1.4.

$$Iy=Pc(y-1)/k1+Ic \qquad \text{Formula 1.5}$$

Where ζ=Pc/k1, Formula 1.5 is represented by the following Formula 1.6.

$$Iy=(y-1)\zeta+Ic \qquad \text{Formula 1.6}$$

Each driver 30 stores k1, Pc, and Ic as known parameters. Instead of k1 and Pc, the value ζ calculated on the basis of k1 and Pc may be stored. In order to change the light amount into Py, the interface unit 24 of the controller 20 broadcasts, for example, y−1 as an instruction value to the drivers 30, and each driver 30 may thus calculate the driving current Iy by using Formula 1.6.

Figure 4:
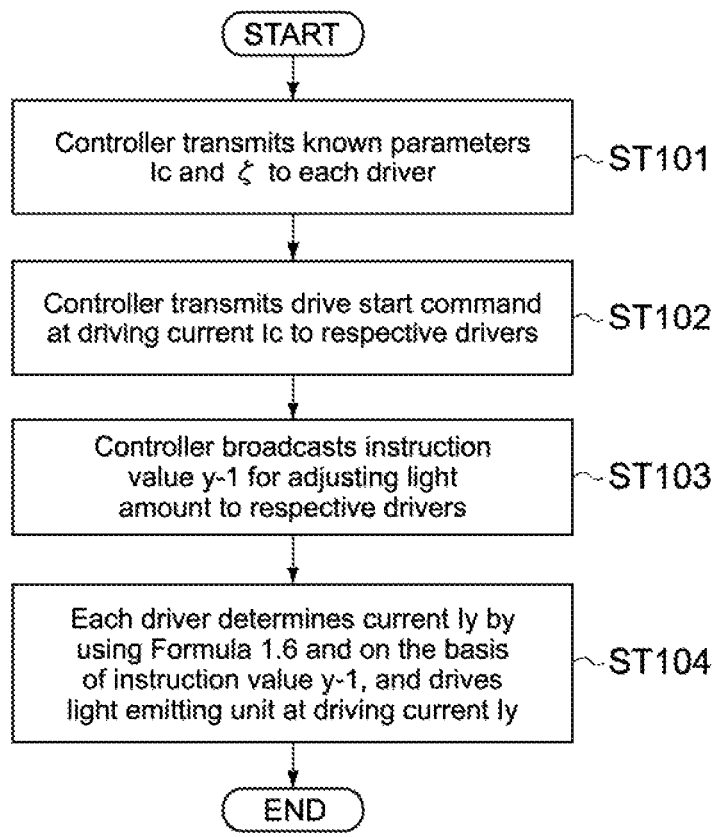
FIG. 4 is a flowchart showing the operation of the light source control apparatus, which has the relation between the driving current and the light amount of FIG. 3.

FIG. 4 is a flowchart showing the operation of the light source control apparatus 101 of the present Embodiment 1.

When the light source control apparatus 101 is powered on, the controller 20 transmits, for example, as default, the above-mentioned known parameters Ic and ζ, which are predetermined for each driver 30, to each driver 30 (Step 101). Each driver 30 obtains Ic and ζ, and stores them in the memory. As described above, each driver 30 may prestore Ic and ζ in a non-volatile memory.

Then the controller 20 transmits a drive start command for driving the light emitting units 40, the current Ic being the target driving current, to the respective drivers 30 (Step 102). The drive start command is also broadcasted and transmitted, typically. Next, when the controller 20 receives an instruction for adjusting the light amount (here, adjusting dimming) from the video signal processor 15, for example, the controller 20 broadcasts the same instruction value y−1 to the respective drivers 30 (Step 103). The instruction value y−1 is a value calculated on the basis of the change rate y from the maximum light amount Pc.

Each driver 30 determines, as the target driving current, the current Iy by using Formula 1.6 including Ic and ζ stored in Step 101 and on the basis of the obtained instruction value y−1, and drives the light emitting unit 40 at the driving current Iy (Step 104).

As described above, the controller 20 broadcasts the instruction value y−1, and each driver 30 thus calculates the driving current Iy by using Formula 1.6. In other words, it is not necessary for the controller 20 to transmit driving current values, which may be different for each light emitting unit 40 (each driver 30), to the respective drivers 30. Therefore the light amount may be adjusted faster.

Especially, if the controller 20 transmits different instruction values to the respective drivers 30 (in order to make the light amounts of the light emitting units 40 different from each other uniform), the controller 20 does not have enough time to transmit the different instruction values for the timing of each one frame. According to the present Embodiment 1, it is only necessary for the controller 20 to broadcast the common instruction value, and the light amounts of the light emitting units 40 may be adjusted for each one frame, for example.

As a matter of course, the controller 20 may transmit y instead of y−1as an instruction value. In this case, each driver 30 calculates y−1. However, since the value y−1 is common to the respective drivers 30, the light amount may be adjusted faster where the controller 20 calculates y−1.

Alternatively, the controller 20 may not prestore ζ as described above, but may calculate Pc/k1 every time the controller 20 adjusts the light amount. However, Pc/k1 is known. By previously executing calculation such as division as described in this embodiment, the calculation amount at the time of adjusting the light amount is reduced, and the light amount may be adjusted faster.

2. 3) Embodiment 2 (Example 2 of Specific Function)

Figure 5:
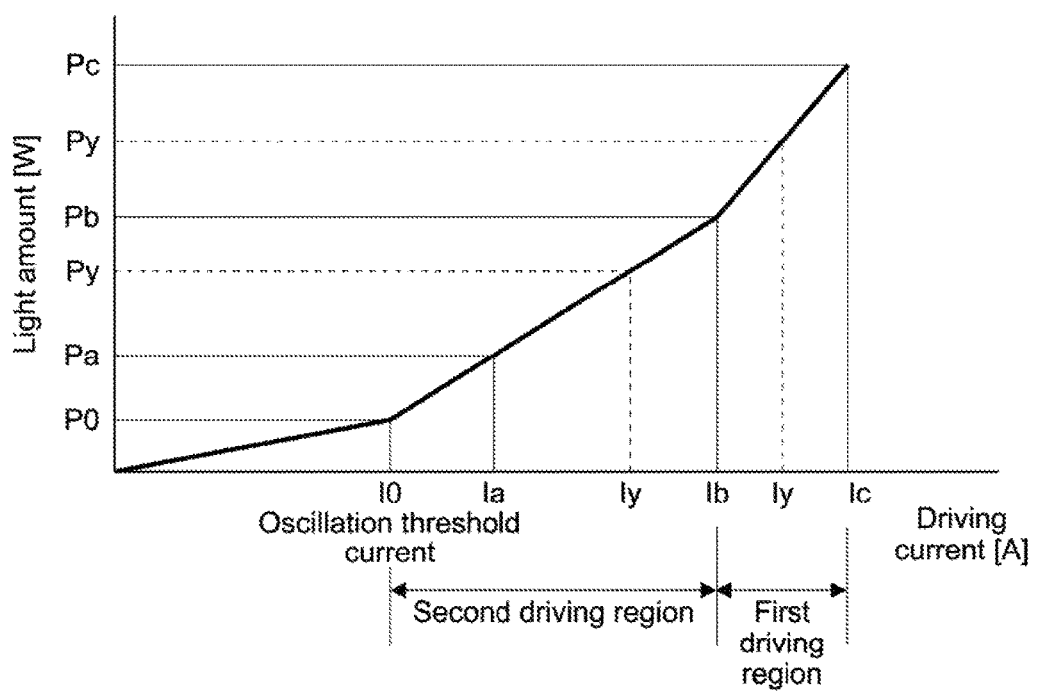
FIG. 5 is a graph showing the relation between the driving current and the light amount of an embodiment, in which a function is approximated by two straight lines in the driving region of the oscillation threshold current or more.

FIG. 5 shows functions according to another embodiment different from the above-mentioned Embodiment 1. In this embodiment, description similar to the description made in the above-mentioned Embodiment 1 will be simplified or omitted, and different points will be described mainly.

In the present Embodiment 2, as shown in FIG. 5, the functions are approximated in a plurality of linear regions corresponding to a plurality of driving regions from the oscillation threshold current I0 to the reference driving current Ic being the reference driving value. In other words, a plurality of functions are defined in the driving regions of the oscillation threshold current I0 or more. Specifically, the functions are set for two linear regions divisionally.

For the purpose of illustration, the region from the driving current Ib to the reference driving current Ic will be referred to as the first driving region, and the region from the oscillation threshold current I0 to the driving current Ib will be referred to as the second driving region. The inclination k1 of the straight line in the first driving region and the inclination k2 of the straight line in the second driving region are represented by the following Formula 2.1 and Formula 2.2, respectively.

$$k1=(Pc-Pb)/(Ic-Ib) \qquad \text{Formula 2.1}$$

$$k2=(Pb-Pa)/(Ib-Ia) \qquad \text{Formula 2.2}$$

In the first driving region (Pb<Py), similar to the above-mentioned Formula 1.6, the following Formula 2.3 is derived by using the inclination k1.

$$Iy=(y-1)\zeta1+Ic \qquad \text{Formula 2.3}$$

Where ζ1=Pc/k1 and y=Py/Pc

In the second driving region (P0<Py≤Pb), the following Formula 2.4 is derived by using the inclination k2.

$$Py=Pb+k2(Iy-Ib) \qquad \text{Formula 2.4}$$

The following Formula 2.5 is obtained by deforming Formula 2.4 where y=Py/Pc.

$$Iy=y*Pc/k2-Pb/k2+Ib \qquad \text{Formula 2.5}$$

Where ζ2=Pc/k2 and ζ3=Pb/k2, Formula 2.5 is represented by the following Formula 2.6.

$$Iy=\zeta2y-\zeta3+Ib \qquad \text{Formula 2.6}$$

As described above, each driver 30 is configured to calculate the driving current Iy by using Formula 2.3 in the first driving region and by using Formula 2.6 in the second driving region. Each driver 30 stores k1, k2, Pc, Ic, Pb, and Ib as known parameters. Each driver 30 may store, instead of k1, the value ζ1 calculated on the basis of k1 and Pc, and may store, instead of k2, the value ζ2 calculated on the basis of k2 and Pc. Alternatively, each driver 30 may store, instead of k2, the value ζ3 calculated on the basis of k2 and Pb.

In order to change the light amount into Py corresponding to the first driving region, the controller 20 broadcasts, for example, y (or maybe y−1) as the instruction value to the drivers 30. Therefore each driver 30 is capable of calculating the driving current Iy by using Formula 2.3 or Formula 2.6.

Figure 6:
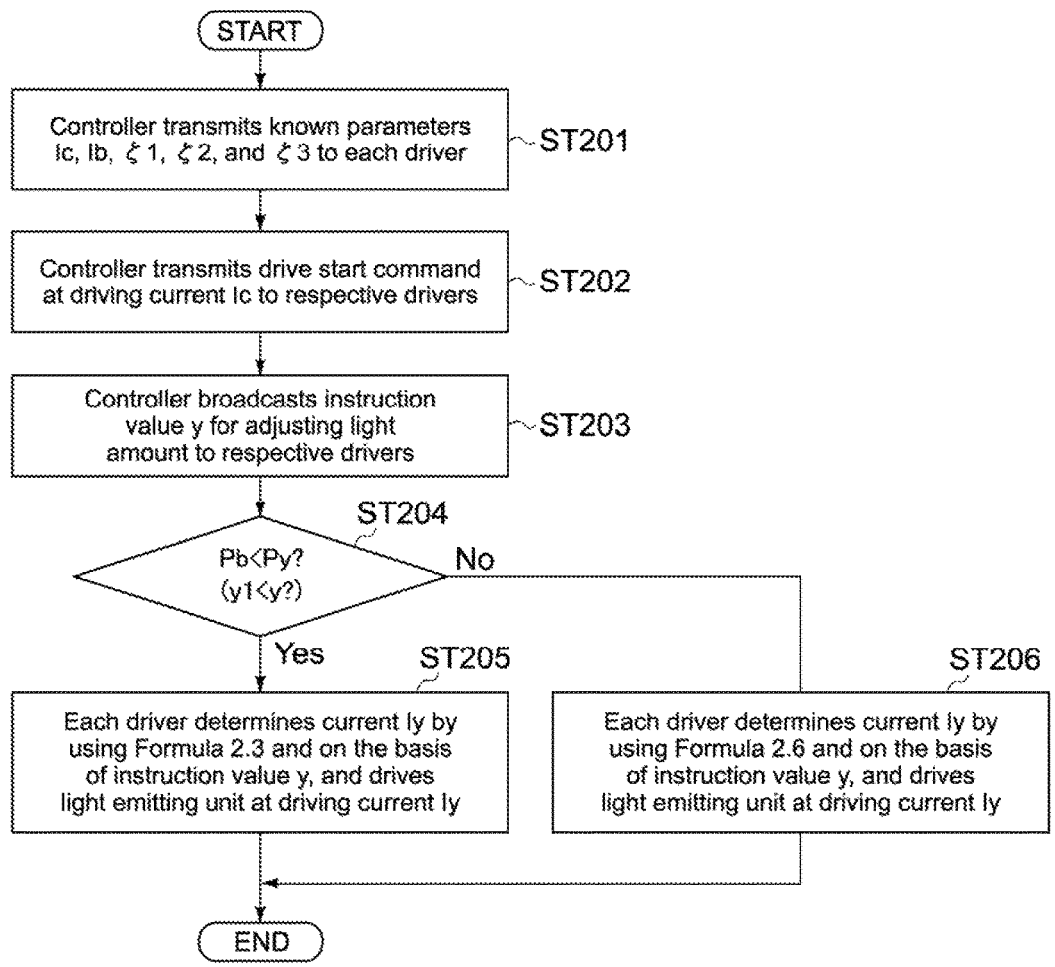
FIG. 6 is a flowchart showing the operation of the light source control apparatus having the relation between the driving current and the light amount of FIG. 4.

FIG. 6 is a flowchart showing the operation of the light source control apparatus of the present Embodiment 2.

When the light source control apparatus 101 is powered on, the controller 20 transmits, for example, as default, the above-mentioned known parameters Ic, Ib, ζ1, ζ2, and ζ3, which are predetermined for each driver 30, to each driver 30 (Step 201). Each driver 30 obtains Ic, Ib, ζ1, ζ2, and ζ3, and stores them in the memory. As described above, each driver 30 may prestore Ic, Ib, ζ1, ζ2, and ζ3 in a non-volatile memory.

The controller 20 transmits a drive start command for driving the light emitting units 40, the current Ic being the target driving current, to the respective drivers 30 (Step 202).

When the controller 20 receives an instruction for adjusting the light amount (here, adjusting dimming) from the video signal processor 15, for example, the controller 20 broadcasts the same instruction value y to the respective drivers 30 (Step 203).

Each driver 30 executes determining process of the instruction value y. In other words, each driver 30 determines whether the light amount Py exceeds Pb or not (Step 204). In Step 204, each driver 30 may prestore the rate y1 of Pb with respect to Pc, i.e., y1=Pb/Pc (for example, may further obtain Pb from the controller 20 in Step 201, and may calculate and store Pb/Pc=y1), and may determine whether y1<y.

Where each driver 30 determines that Pb<Py (y1<y), each driver 30 determines, as the target driving current, the current Iy by using Formula 2.3 and on the basis of the instruction value y, and drives the light emitting unit 40 at the driving current Iy (Step 205). Meanwhile, where each driver 30 does not determine that Pb<Py (y1<y), each driver 30 determines, as the target driving current, the current Iy by using Formula 2.6 and on the basis of the instruction value y, and drives the light emitting unit 40 at the driving current Iy (Step 206).

As described above, according to the present Embodiment 2, the relation between the driving current and the light amount is defined for each of a plurality of divided driving regions. Therefore, although the calculation amount is larger than that of Embodiment 1, the light amount is adjusted more accurately.

2. 4)

The above-mentioned Embodiments 1 and 2 also have the following effects. Since the respective drivers 30 execute calculation in parallel in this embodiment, the calculation execution time period of this embodiment is shorter than that of a mode, in which a controller such as a CPU and an MPU calculates and transmits current target values set for respective drivers.

Further, since the calculation processing amount of the main controller 22 is reduced, the load applied to the main controller 22 is reduced and the main controller 22 may execute other necessary processing faster.

3. Light Source Control Apparatus of Another Embodiment

Figure 7:
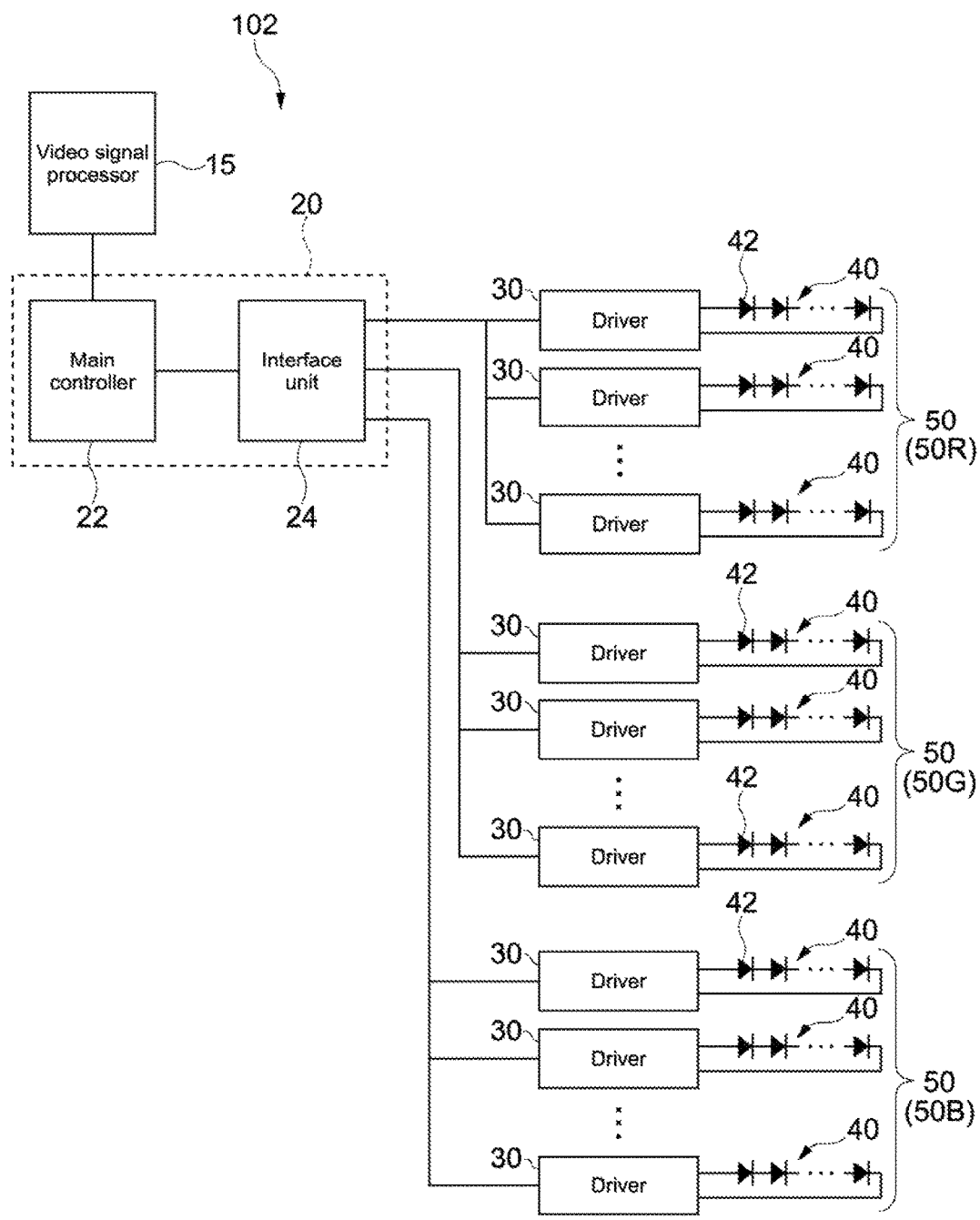
FIG. 7 is a block diagram showing a light source control apparatus according to another embodiment of the present technology.

FIG. 7 is a block diagram showing a light source control apparatus according to another embodiment of the present technology. The light source control apparatus 102 includes the three light sources 50R, 50G, and 50B that emit lights of three different colors in place of the light source of the light source control apparatus 101 of FIG. 1. In other words, the light source control apparatus 102 includes the light sources 50R, 50G, and 50B that emit lights having a plurality of wavelength bands.

The light source 50R includes the plurality of light emitting units 40 that emit light having the red wavelength band, for example. The light emission G includes the plurality of light emitting units 40 that emit light having the green wavelength band, for example. The light source 50B includes the plurality of light emitting units 40 that emit light having the blue wavelength band, for example. In other words, the light sources 50R, 50G, and 50B generate white light. Similar to the mode shown in FIG. 1, the light emitting unit 40 includes the plurality of light emitting devices 42 connected in series.

The controller 20 obtains luminance data of video signals corresponding to the three light sources 50R, 50G, and 50B from the video signal processor 15. The controller 20 causes, on the basis of the luminance data, each of the light sources 50R, 50G, and 50B to emit light at the brightness (luminance) of all the light emitting units 40 of each light source 50 for one frame or a plurality of frames. The controller 20 is configured to broadcast instruction values basically different for each light source 50 (or maybe same instruction value) to all the light sources 50 at the same timing all together. Alternatively, the transmission timing may be slightly different for each of the different light sources 50 as long as video display is not affected (for example, time difference shorter enough than the time of one frame).

Further, each drivers 30 determines the driving current by using the above-mentioned function and on the basis of the instruction value of each light source, and causes each of the light sources 50R, 50G, and 50B to emit light at the driving current.

As described above, the controller 20 broadcasts the instruction values (at least including first instruction value and second instruction value) to the drivers 30 (at least including plurality of first wavelength band light-emitting drivers and plurality of second wavelength band light-emitting drivers), the drivers 30 being provided for the light sources 50 that generate light having a plurality of wavelength bands (i.e., at least including first wavelength band and second wavelength band). Further, since each driver 30 determines the driving current by using the function, the light amount may be adjusted faster where the three light sources 50R, 50G, and 50B are used.

4. Projector

Figure 8:
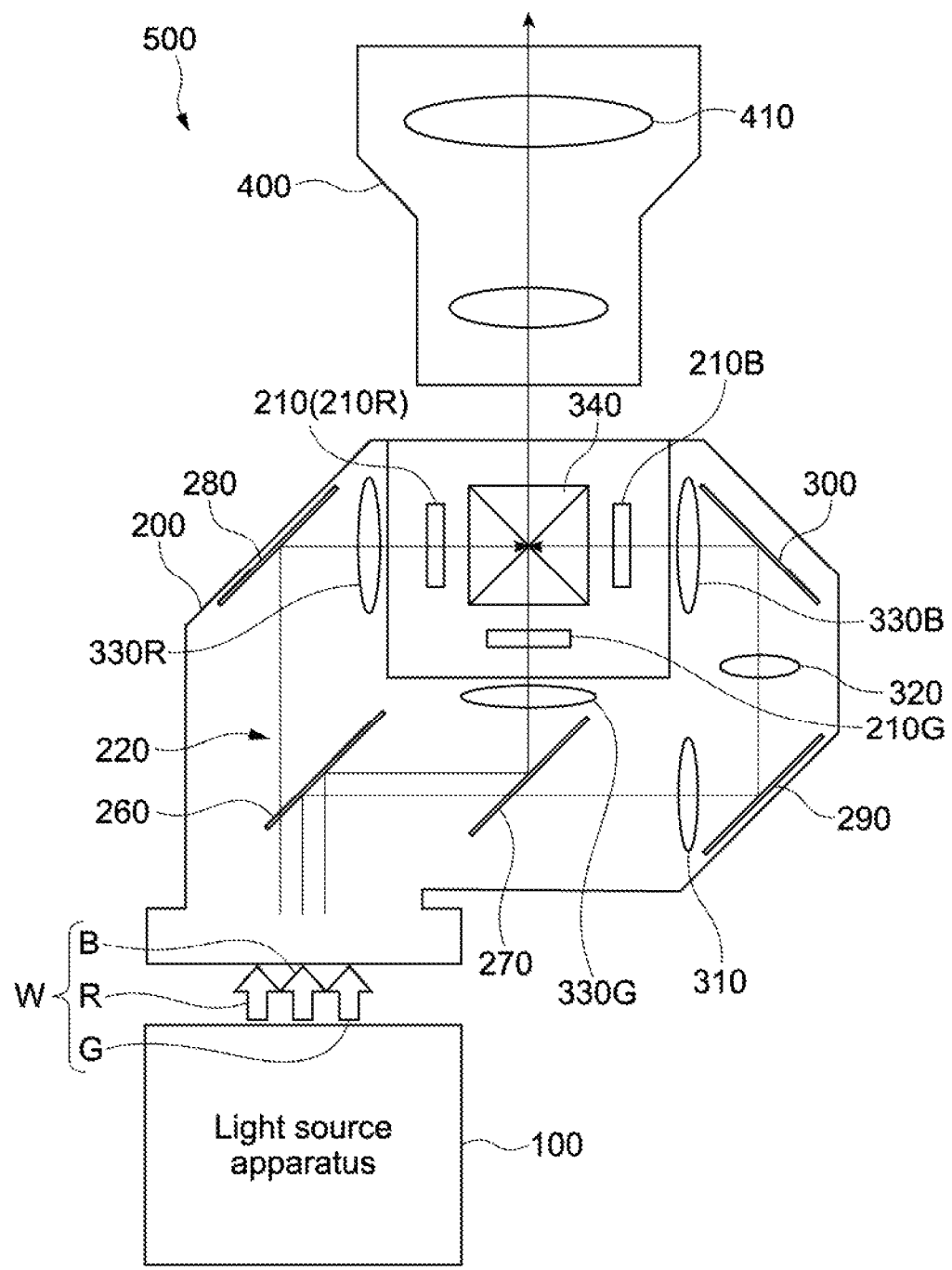
FIG. 8 shows an example of the structure of an optical system of a projector including the light source control apparatus of FIG. 7.

FIG. 8 shows an example of the structure of an optical system of a projector including the light source control apparatus 102 of FIG. 7, for example. The projector 500 includes the light source apparatus 100 capable of emitting white light, the image generating unit 200 that generates an image on the basis of the light source apparatus 100, and the projection unit (projection optical system) 400 that projects the generated image on a screen or the like (not shown).

The light source apparatus 100 combines the red laser light R having the red wavelength band, the green laser light G having the green wavelength band, and the blue laser light B having the blue wavelength band, and emits the white light W. The light source apparatus 100 is an apparatus including the light source control apparatus 102 of FIG. 7, for example.

The image generating unit 200 includes the light modulation devices 210 that generate an image on the basis of emitted light, and the illumination optical system 220 that irradiates the light modulation devices 210 with white light from the light source apparatus 100. The illumination optical system 220 includes the dichroic mirrors 260 and 270, the mirrors 280, 290, and 300, the relay lenses 310 and 320, the field lenses 330R, 330G, and 330B, the liquid crystal devices 210R, 210G, and 210B as the light modulation devices 210, for example, and the dichroic prism 340.

Each of the dichroic mirrors 260 and 270 has a property of selectively reflecting light having color of a predetermined wavelength band and transmitting light having the other wavelength band. For example, the dichroic mirror 260 selectively reflects the green laser light G and the blue laser light B. The dichroic mirror 270 selectively reflects the green laser light G out of the green laser light G and the blue laser light B reflected by the dichroic mirror 260. The dichroic mirror 270 transmits the remaining blue laser light B. As a result, light emitted from the light source apparatus 100 is separated into a plurality of laser lights having different colors. Note that the structure for separating light into a plurality of laser lights, the used devices, and the like are not limited to the above.

The separated red laser light R is reflected by the mirror 280, passes through the field lens 330R and is thus parallelized, and enters the liquid crystal device 210R. The green laser light G passes through the field lens 330G and is thus parallelized, and enters the liquid crystal device 210G. The blue laser light B passes through the relay lens 310, is reflected by the mirror 290, then passes through the relay lens 320, and is reflected by the mirror 300. The blue laser light B, which is reflected by the mirror 300, passes through the field lens 330B and is thus parallelized, and enters the liquid crystal device 210B.

The liquid crystal devices 210R, 210G, and 210B are electrically connected to a signal source (for example, PC, etc.) (not shown) that supplies image signals including image information. Each of the liquid crystal devices 210R, 210G, and 210B modulates entered light for each pixel on the basis of the supplied image signal of each color, and generates each of a red image, a green image, and a blue image. The modulated laser lights (formed images) of the respective colors enter the dichroic prism 340 and are combined. The dichroic prism 340 superimposes the lights of the respective colors entered in the three directions on one another to combine the lights, and emits the combined light toward the projection unit 400.

The projection unit 400 projects the image generated by the light modulation devices 210. The projection unit 400 includes the plurality of lenses 410 and the like, and irradiates a screen or the like (not shown) with the light combined by the dichroic prism 340. As a result, a full-color image is displayed.

5. Other Various Embodiments

The present technology is not limited to the above-mentioned embodiments, but other various embodiments may be realized.

For example, the controller 20 may be configured to update a function or parameters of the function on the basis of predetermined conditions. Specifically, predetermined conditions include elapse of predetermined days after power-on, a case where the latest known parameters are different from (the known parameters of) the function factory-stored in the light source control apparatus as default, and the like. In the latter case, for example, the light source control apparatus may include a luminance sensor or the like, and the controller 20 may be configured to inspect and record the driving current and the light emitting amount of the light emitting units 40 periodically, occasionally, when an operation is input by a user, or the like. As a result, even if the light emitting units 40 deteriorate over time or over years, the light amount may be adjusted accurately.

An LED (Light Emitting Diode) may be used as a device being each light emitting unit 40 of the light source 50 in place of an LD.

In the above-mentioned embodiments, the reference light amount is the maximum light amount. Not limited to this, it may be an arbitrary light amount.

A liquid crystal device is used as the light modulation device. Alternatively, a DMD (Digital Micro-mirror Device) may be used.

A projector that projects a 3D video may be realized where the light source control apparatus 102 of FIG. 7 further includes the three RGB light sources 50R, 50G, and 50B of another system. In this case, the light source control apparatus 102 is designed such that six parallel lines are connected to the interface unit 24 (see FIG. 7).

In the above-mentioned embodiments, the controller is configured to broadcast the instruction value to the respective drivers. However, the controller is not necessarily to "broadcast" the instruction value to the respective drivers, but may be configured to transmit the instruction value to at least two drivers at different timing.

In the above-mentioned embodiments, one light emitting unit 40 includes the plurality of light emitting devices 42, but may include a single light emitting device 42. The above-mentioned embodiments of the light source control apparatus may be combined with the embodiments of a light source control apparatus and a light source unit described below. Further, the above-mentioned projector may include a light source control apparatus and a light source unit of the embodiment described below.

At least two characteristic parts out of the characteristic parts of the above-mentioned embodiments may be combined. The same applies to embodiments described below.

6. Problem Resulting from Return Current of Light Source

By the way, each light emitting unit of a light source has a relatively large return current. When such a large current flows into a reference line (typically, ground line) of a controller board of an electronic apparatus, the following problem may occur. In short, when a large current flows into the ground line, a potential difference is generated on the basis of a resistance value defined by the wiring pattern, and a common-mode noise is generated as a result.

It is another object of the present disclosure to provide a technology capable of reducing generation of a potential difference generated due to a wiring pattern of a reference line.

Figure 9:
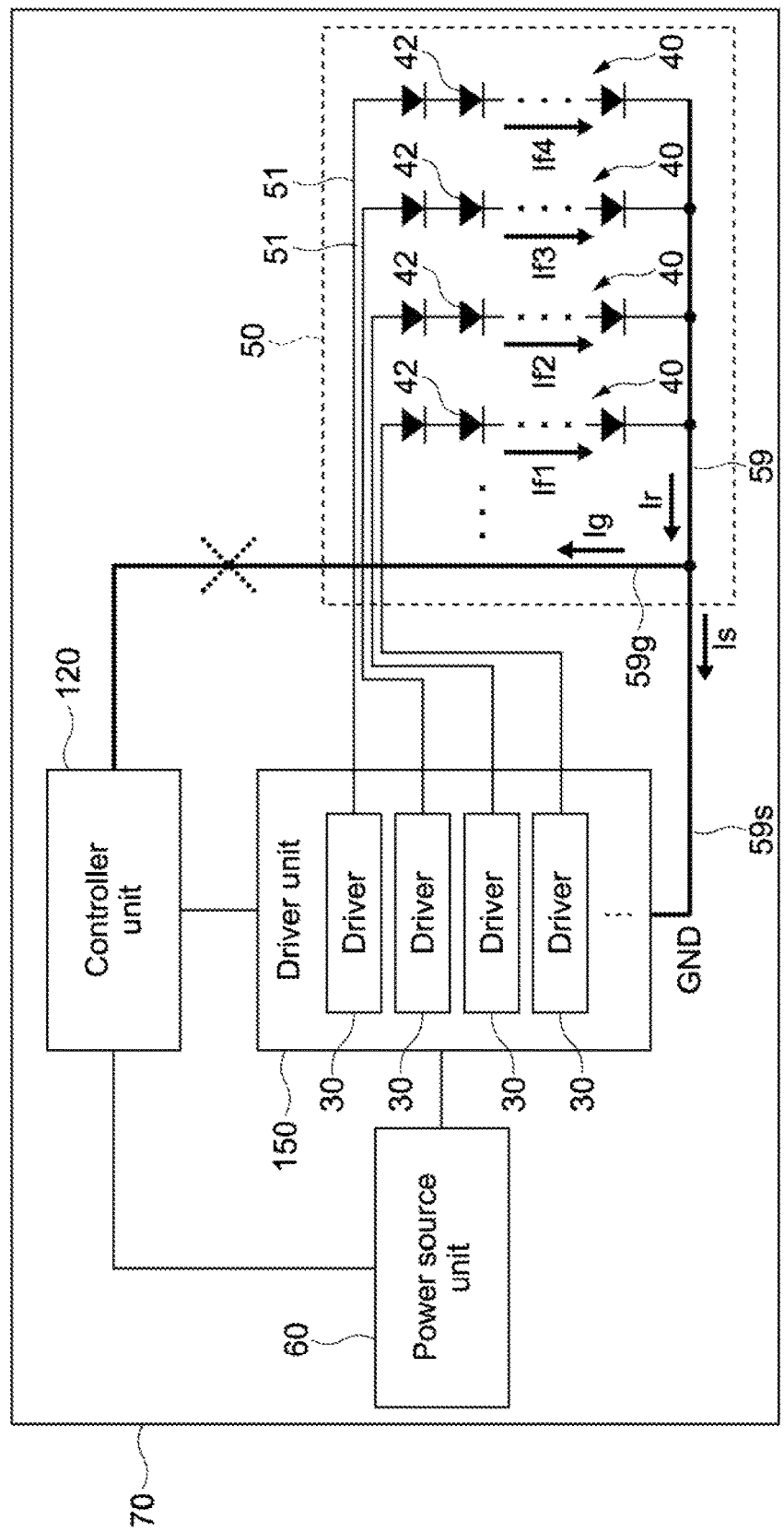
FIG. 9 shows a configuration of a light source and a light source control apparatus for illustrating another problem, and is a diagram showing a comparative example of the present technology.

FIG. 9 shows a configuration of a light source and a light source control apparatus for illustrating the above-mentioned problem specifically, and is a diagram showing a comparative example of the present technology. An apparatus of FIG. 9 includes the power source unit 60, the controller unit (for example, controller board) 120, the driver unit 150, and the light source (light source unit) 50. Note that, in the above-mentioned embodiments of FIG. 1 and the like, the power source unit 60 is not shown and description thereof is omitted.

The controller unit 120 transmits control signals to the plurality of drivers 30 of the driver unit 150, and controls the respective driver 30 to drive. The controller unit 120 includes a board unit including "the controller 20" (see FIG. 1) of the above-mentioned embodiment, for example. In this case, the controller unit 120 may include the interface unit 24 and the video signal processor 15. Alternatively, the controller unit 120 may not include the interface unit 24 and the video signal processor 15, which are provided outside of the controller unit 120.

As described in the above-mentioned embodiments, each light emitting unit 40 is connected to each driver 30 of the driver unit 150. As described above, for example, one light emitting unit 40 includes the plurality of light emitting devices 42 connected in series. The power source unit 60 supplies power to the controller unit 120 and the driver unit 150, and also supplies power to the light source unit 50 via the driver unit 150.

(The respective drivers 30) of the driver unit 150 are connected to the (plurality of) positive supply lines 51 and the ground line 59. Each light emitting unit 40 is connected between the ground line 59 and each positive supply line 51. A potential higher than 0 volts of the ground line 59 is applied to each positive supply line 51. Each light emitting unit 40 is driven by a current generated by the voltage between the ground line 59 and each positive supply line 51.

Here, if the controller unit 120 is also connected to a ground line (line 59g), the following problem will occur. The return current from the light emitting units 40 flowing in the ground line 59 is a large current, and this large current flows into the driver unit 150 and the controller unit 120. For example, if a current of 1 A to 2 A flows in one light emitting unit 40 and twenty light emitting units 40 are provided, a large return current of 20 A to 40 A flows in the ground line 59.

For example, as shown in FIG. 9, the values of the currents flowing in the (for example, four) light emitting units 40 will be referred to as If1, If2, If3, and If4, respectively. The current flowing in the ground line 59 is the sum of those four current values, and the sum Ir is represented by Ir=If1+If2+If3+If4. Further, where Is is the current flowing in the line 59s of the ground line 59 toward the driver unit 150 and where Ig is the current flowing in the line 59g toward the controller unit 120, Ir=Ig+Is. Where the impedance of the controller unit 120 is approximately the same as the impedance of the driver unit 150, Ig=Ir. In other words, the half of Ir current flows into the controller unit 120.

Since the driver unit 150 is designed so as to treat a large current, a large return current flowing into the driver unit 150 may not lead to a problem. Meanwhile, if a large current flows into the controller unit 120, as described above, a potential difference based on a resistance value, which is determined on the basis of a wiring pattern of the ground line of the controller unit 120, is generated, and a common-mode noise is generated as a result.

Specifically, an electronic apparatus including the light source and the light source control apparatus may include the conductive frame 70 that supports respective components including the light source unit 50, the controller unit 120 (controller board), and the like. In this case, the conductive frame 70 functions as an electric ground for the light source control apparatus. Where there is the conductive frame 70, as described above, a potential difference is generated between the ground line of the controller unit 120 and the conductive frame 70, and a common-mode noise is generated as a result.

To solve such a problem, it is considered that the light source unit 50 is insulated from the above-mentioned conductive frame 70. In the conductive frame 70 of FIG. 9, the dotted "cross" mark schematically shows that the light source unit 50 is insulated from the controller unit 120 (conductive frame 70) as described above. Where the light source unit 50 is insulated from the conductive frame 70 in this way, it is possible to prevent the current Ig flowing into the controller unit 120 through the conductive frame 70.

By the way, it is necessary to remove the light source unit 50 from an apparatus (for example, projector) in order to operate the light source unit 50 (for example, for maintenance, etc.). In order to remove the light source unit 50, a cable that connects the driver unit 150 with the light source unit 50 is disconnected. However, if the above-mentioned insulation method as shown in the "cross" mark is employed, when the cable that connects the driver unit 150 with the light source unit 50 is disconnected, the light source unit 50 electrically floats. Static electricity is generated in the light source unit 50, and the light emitting devices 42 are thereby deteriorated, which is one of problems.

6. 1) Embodiment for Solving the Above-Mentioned Problem

Figure 10:
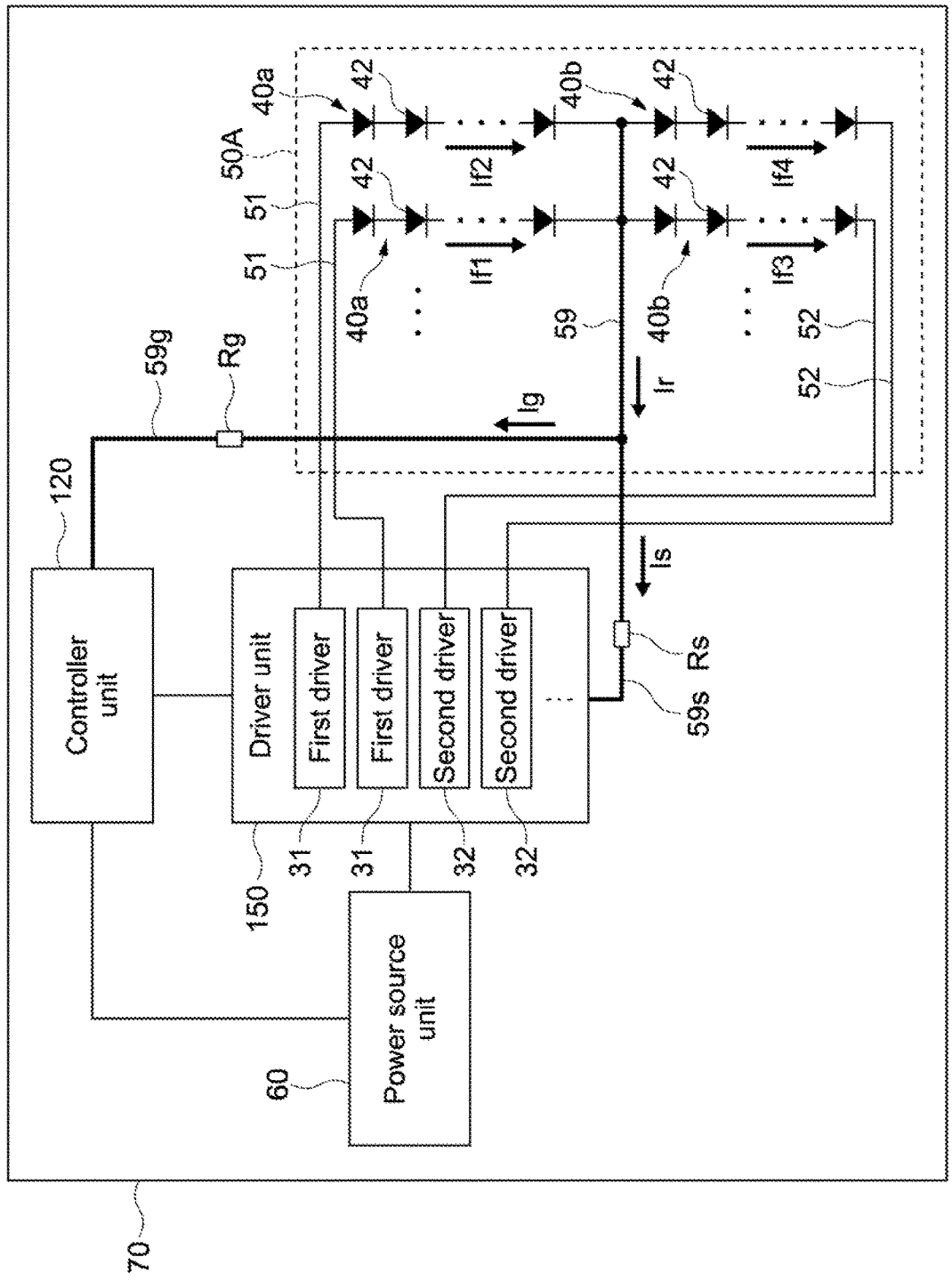
FIG. 10 shows configurations of a light source unit and a light source control apparatus for controlling the light source unit according to an embodiment for solving the above-mentioned other problem.

FIG. 10 shows configurations of a light source unit and a light source control apparatus for controlling the light source unit according to an embodiment for solving the above-mentioned problem. In this embodiment, the components the same as the component of the apparatus of the above-mentioned comparative example (see FIG. 9) will be denoted by the same reference signs, and description thereof will be omitted or simplified.

The apparatus of this embodiment is different from the apparatus of the above-mentioned comparative example mainly as follows. The light source unit 50A of this embodiment further includes the negative supply lines (second line) 52 in addition to the positive supply lines (first line) 51 and the ground line (reference line) 59. Further, the second light emitting units 40b, i.e., at least one light emitting unit 40, are connected between the ground line 59 and the negative supply lines 52.

The driver unit 150 is connected to the ground line 59, the positive supply lines 51 and the negative supply lines 52. Specifically, the driver unit 150 includes one or more first drivers 31. Each first driver 31 generates a voltage between the reference potential (for example, 0 V) and a potential higher than the reference potential, and causes each first light emitting unit 40a to drive. In other words, each first driver 31 is connected between each positive supply line 51 and the ground line 59 (line 59s).

Further, the driver unit 150 includes one or more second drivers 32. Each second driver 32 generates a voltage between the reference potential (for example, 0 V) and a potential lower than the reference potential, and drives each second light emitting unit 40b. In other words, each second driver 32 is connected between each negative supply line 52 and the ground line 59 (line 59s).

In FIG. 10, for example, the values of the currents flowing in the two first light emitting units 40a will be referred to as If1 and If2, respectively. Further, the values of the currents flowing in the two second light emitting units 40b will be referred to as If3 and If4, respectively. The sum Ir of the current value flowing in the merging point of the line 59s connected to the driver unit 150 and the line 59g connected to the controller unit 120 out of the ground line 59 is Ir=If1+If2−(If3+If4). Further, where Is is the current flowing in the line 59s and where Ig is the current flowing in the line 59g, Ir=Ig+Is.

Ir is obtained by subtracting If3 and If4 from the sum of If1 and If2. In this embodiment, since each light emitting unit 40 is driven by constant current driving (including luminance adjusting range), If1, If2, If3, and If4 are substantially the same and Ir is thus an extremely small value. Therefore, since Ir=Ig+Is as described above, Ig is also an extremely small value.

As described above, in this embodiment, the return current flowing into the controller unit 120 through the ground line 59 may be an extremely small value. As a result, generation of a potential difference based on a wiring pattern of the ground line of the controller unit 120 is reduced, and a common-mode noise is reduced. As a result, it is possible to prevent malfunction of the controller unit 120 during signal processing may be prevented.

Further, in this embodiment, since the return current is extremely small, as described above, it is not necessary to insulate the light source unit 50 from the conductive frame 70, which functions as a ground base. It is not necessary to disconnect a cable that connects the driver unit 150 with the light source unit 50 in order to operate the light source unit 50 (for example, for maintenance operation), and workability is increased. Further, the light source unit 50 does not electrically float, and generation of static electricity in the light source unit 50 is reduced. As a result, deterioration of the light emitting devices 42 is reduced.

In this embodiment, since the potential of 0 V is used as the reference potential, the design of the circuit of each driver may be simple. As a matter of course, a positive potential may be used as the reference potential. For example, the high potential side may be 20 V, the reference potential may be 10 V, and the low potential side may be 0 V. In this case, the first light emitting unit 40a may be connected between the high potential side line (first line) and the reference line (reference potential side line), and the second light emitting unit 40b may be connected between the reference line and the low potential side line (second line). In other words, the anode of the first light emitting unit 40a is connected to the high potential side line, and the cathode of the first light emitting unit 40a is connected to the reference line. Further, the anode of the second light emitting unit 40b is connected to the reference line, and the cathode of the second light emitting unit 40b is connected to the low potential side line.

According to this embodiment, the reference potential is set at a constant value (typically, ground potential, i.e., 0 V), and each second driver 32 adjusts the potential of each negative supply line 52. As a result, the above-mentioned driving value (current value) may be adjusted. In this way, since the potential lower than the reference potential is adjusted, troubles of the second drivers 32 and the other circuits are reduced and safety is increased, which are advantageous effects. Further, in this case, each first driver 31 is configured to adjust the potential of the positive supply line 51 to thereby adjust the driving value (current value).

As shown in FIG. 10, the light source control apparatus may include the resistor element Rg in the line 59g and the resistor element Rs in the line 59s. As a result, the return current is converted into thermal energy, and therefore the value of the return current flowing into the controller unit 120 and the driver unit 150 may be reduced.

Note that only one of the resistor elements Rg and Rs may be provided. In this case, preferably, only the resistor element Rg is provided. Note that the resistor elements Rg and Rs are not essential components.

6. 2) Another Embodiment for Solving the Above-Mentioned Problem

Figure 11:
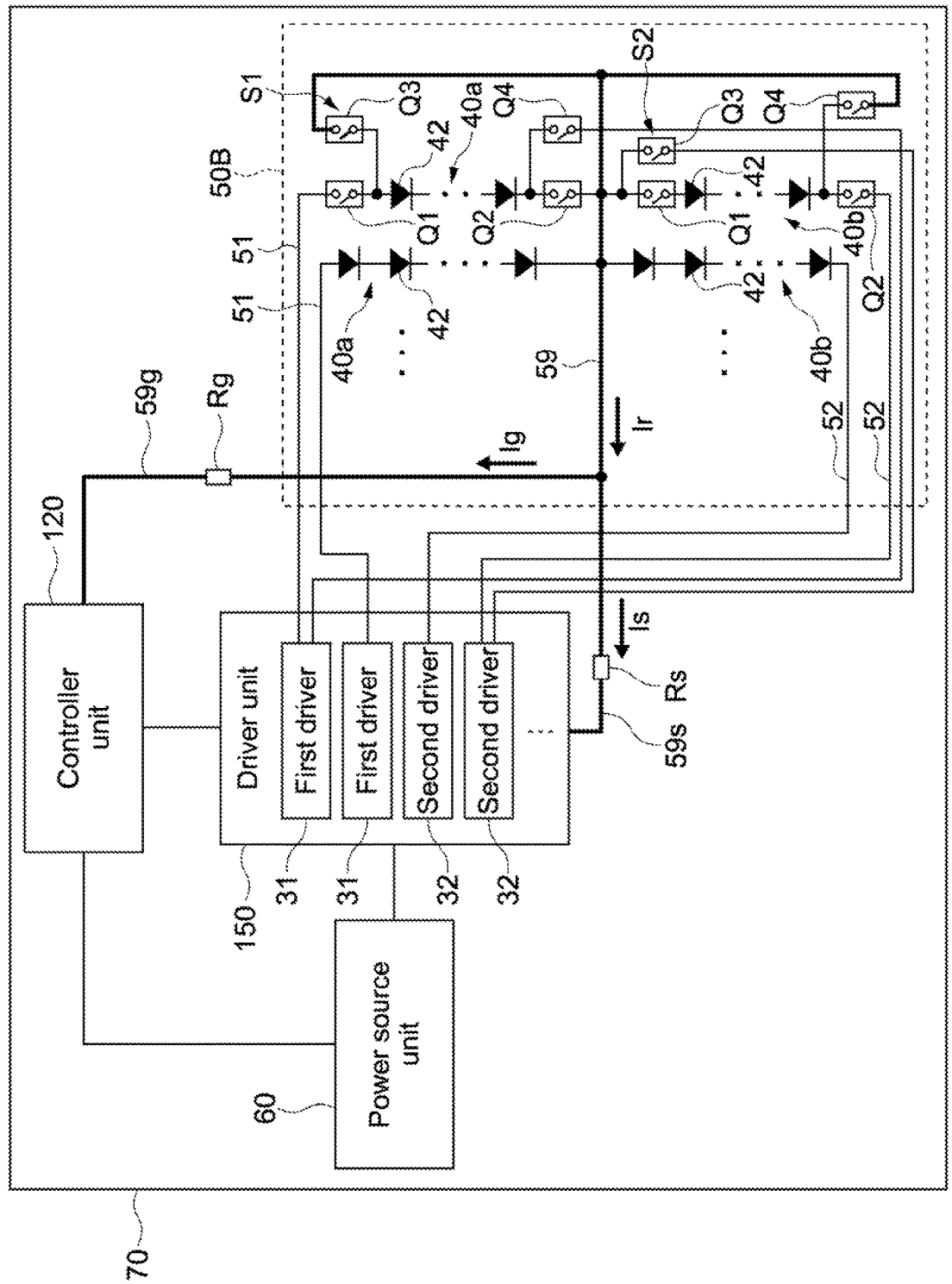
FIG. 11 shows configurations of a light source unit and a light source control apparatus for controlling the light source unit according to an embodiment different from the embodiment of FIG. 10.

FIG. 11 shows configurations of a light source and a light source control apparatus according to another embodiment for solving the above-mentioned problem.

The apparatus of this embodiment is different from that of the above-mentioned embodiment as follows. The apparatus of this embodiment includes a switcher unit that switches connection targets of the first light emitting unit 40a such that the anode of the first light emitting unit 40a at the high potential side is connected to the ground line 59 and the cathode of the first light emitting unit 40a is connected to the negative supply line 52. For example, the switcher unit includes the controller unit 120 and the switch groups S1 and S2.

The switch group S1 includes the four switches Q1 to Q4 connected to one or more (or maybe all the) first light emitting units 40a. Similarly, the switch group S2 includes the four switches Q1 to Q4 connected to one or more (or maybe all the) second light emitting units 40b. FIG. 11 shows a configuration in which the first light emitting unit 40a includes one switch group, and the second light emitting unit 40b includes one switch group.

For example, semiconductor switches such as FET (Field Effect Transistor) are used as the switches Q1 to Q4. The controller unit 120 controls on/off switching of the switches Q1 to Q4. Hereinafter, the switch group S1 of the first light emitting unit 40a will be described.

The switch Q1 is connected between the positive supply line 51 and the anode of the first light emitting unit 40a (anode of the light emitting device 42 at an end). The switch Q2 is connected between the cathode of the first light emitting unit 40a (cathode of the light emitting device 42 at the opposite end) and the ground line 59.

The switch Q3 is connected to the anode of the first light emitting unit 40a in parallel with the switch Q1, and connected between the anode of the first light emitting unit 40a and the ground line 59. The switch Q4 is connected to the cathode of the first light emitting unit 40a in parallel with the switch Q2, and connected between the cathode of the first light emitting unit 40a and the ground line 59.

According to this configuration, the following operation is executable. For example, it is assumed that the light source unit 50 includes a plurality of (for example, ten) first light emitting units 40a and a plurality of (for example, ten) second light emitting units 40b. In this case, if even-number, for example, two, second light emitting units 40b are in trouble out of the ten second light emitting unit 40b, the controller unit 120 detects that by using any method. Examples of detection methods include current detection, voltage detection, or light emission illuminance detection.

Further, the controller unit 120 switches the switch group S1 such that one first light emitting unit 40a including the switch group S1 functions as a light emitting unit at the low potential side, i.e., functions as a second light emitting unit. Specifically, in the first light emitting unit 40a, the switches Q1 and Q2 are turned off, and the switches Q3 and Q4 are turned on. Then, nine light emitting units at the high potential side operate normally, and also nine light emitting units at the low potential side operate normally. As a result, the electric power and illuminance of the positive side and the negative side of the light source unit 50 are well balanced. As a result, even if some of the light emitting units are in trouble, it is easy to control the light source unit 50, and generation of illuminance unevenness may be prevented.

For example, even if even-number first light emitting units 40a are in trouble, by switching the switch group S2 of the second light emitting unit 40b in the similar way, the similar effect may be obtained.

Not limited to the purpose of making a good balance of the positive side and the negative side, the on/off control of the switch groups may be performed for other purposes. Examples of other purposes include to adjust the basic light emission amount from the light source unit 50 (for example, in a case of using an apparatus always at a light amount the half of the maximum light emission amount) and the like.

According to this embodiment, similar to the above-mentioned embodiment, the reference potential is set at a constant value (typically, ground potential, i.e., 0 V), and each second driver 32 adjusts the potential of each negative supply line 52. As a result, the above-mentioned driving value (current value) may be adjusted. Further, in this case, each first driver 31 is configured to adjust the potential of the positive supply line 51 to thereby adjust the driving value (current value).

7. Embodiment 3

Next, Embodiment 3 will be described, which is different from the above-mentioned 2. 2) Embodiment 1 (Example 1 of specific function) and 2. 3) Embodiment 2 (Example 2 of specific function). The present Embodiment 3 is a modification example of the mode shown in FIG. 5 including a plurality of driving regions (for example, function regions of a plurality of straight lines). In other words, similar to Embodiment 2, the present Embodiment 3 is also applied to a case in which the entire curve of a function is approximated in a plurality of linear regions.

Figure 12:
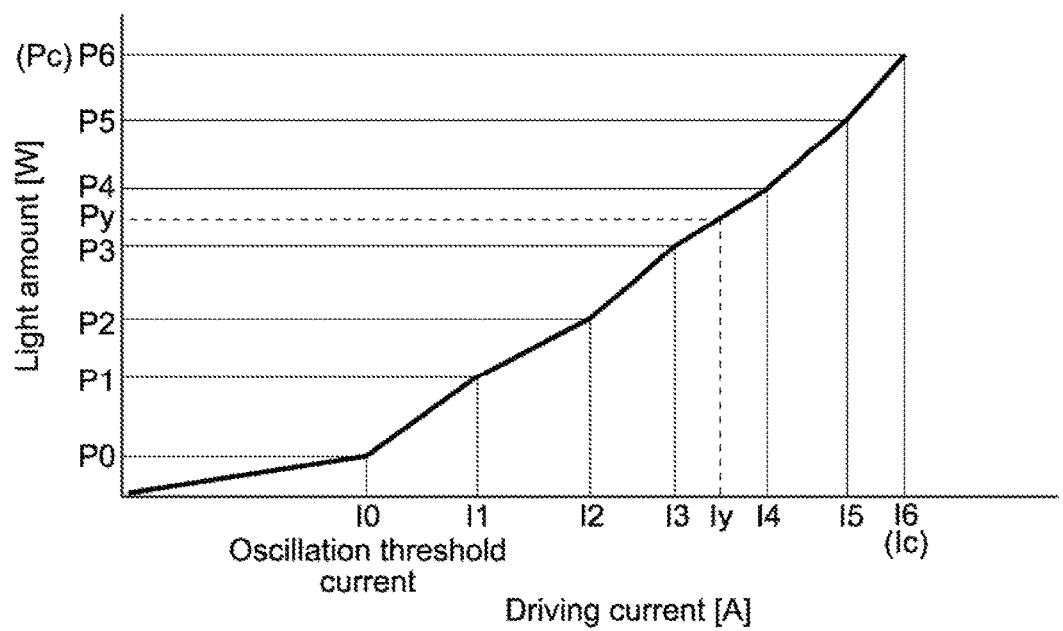
FIG. 12 is a graph showing the relation between the driving current and the light amount of Embodiment 3.

FIG. 12 is a graph showing the relation between the driving current and the light amount of Embodiment 3. A functions is shown. The function includes, as a plurality of function regions, for example, six linear regions from the oscillation threshold current I0 to the reference driving current Ic.

Similar to the gist of the above-mentioned Formula 1.4, $$Iy=(Py-P_n)/k_n+I_n \qquad \text{Formula 3.1}$$

n is an integer of 0 or more. In this embodiment, the reference driving current Ic is $I_6$, and the reference light amount Pc corresponding to this Ic is $P_6$.

Similar to the gist of the above-mentioned Formula 1.1, inclination $k_n$ is represented by the following Formula 3.2.

$$k_n=(P_{n+1}-P_n)/(I_{n+1}-I_n) \qquad \text{Formula 3.2}$$

Formula 3.1 is converted into the following Formula 3.3 on the basis of Formula 3.2.

$$Iy=[(I_{n+1}-I_n)/(P_{n+1}-P_n)](Py-P_n)+I_n \qquad \text{Formula 3.3}$$

In the example of FIG. 12, $P_3 \le Py \le P_4$.

Each driver 30 obtains from the controller 20 or prestores the maximum value of n (in this embodiment, 6), $I_n$, and $P_n$, as known parameters. For example, the controller 20 transmits those known parameters to each driver 30 before adjusting the light amount (for example, when powering on). Alternatively, each driver 30 prestores factory-configured known parameters.

Further, each driver 30 may obtain from the controller 20 or prestore the calculation results of "$(I_{n+1}-I_n)/(P_{n+1}-P_n)$" of Formula 3.3 of the respective linear regions. When adjusting the light amount, the controller 20 broadcasts the instruction value y (=Py/Pc) to the respective drivers 30. Each of the drivers 30 determines the n value on the basis of y (Py corresponding to y) received from the controller 20 to thereby determine the linear region to be applied to adjustment. Then each of the drivers 30 adjusts the light amount on the basis of Formula 3.3.

Note that each driver 30 may obtain the maximum value of n on the basis of $I_n$ and $P_n$ that the driver 30 stores. In other words, the driver 30 is capable of calculating the maximum value of n on the basis of the number of $I_n$ or $P_n$. Further, since Ic=$I_6$ and Pc=$P_6$, the driver 30 may store $I_6$ and $P_6$ as Ic and Pc.

8. To Generate Function of Driving Current and Light Amount

Next, a means for generating a function of a driving current and a light amount easily when designing the light source control apparatus of the present technology will be described.

Figure 13A:
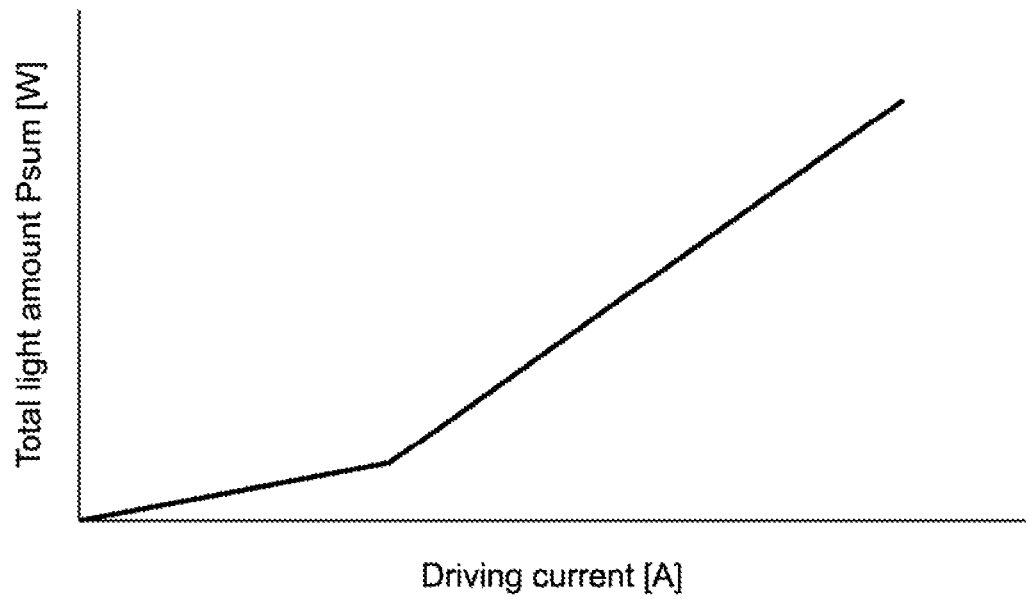
FIG. 13A is a graph showing the relation between the driving current and the total light amount.

For example, as the plurality of light emitting units 40 (see FIG. 1, etc.), the N-number light emitting units 40 are driven at the same current value, the light amount is measured under this situation, and thereby the function of the total light amount of the N-number light emitting units 40 is generated. The total light amount of the N-number light emitting units 40 will be referred to as Psum. FIG. 13A is a graph showing the relation between the driving current and the total light amount Psum.

Psum is multiplied by 1/N to thereby calculate the average value of the N number. The light amount of each one light emitting unit 40 will be referred to as Pone. In other words, the average light amount Pone will be represented by the following formula.

$$Pone=Psum/N \qquad \text{Formula 4.1}$$

Figure 13B:
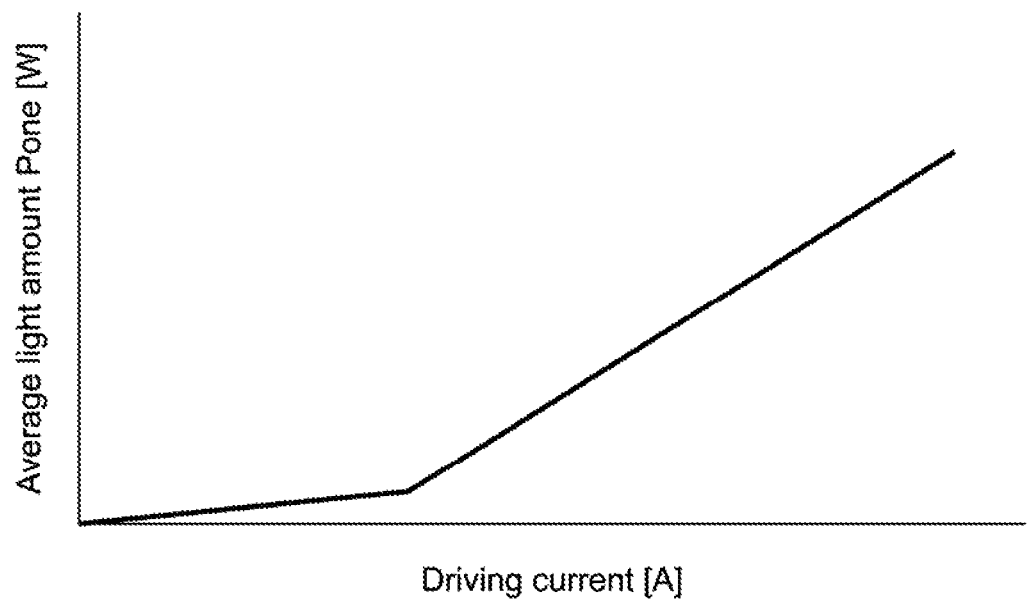
FIG. 13B is a graph showing the relation between the driving current and the average light amount.

FIG. 13B is a graph showing the relation between the driving current and the average light amount Pone. In each of the above-mentioned Embodiments 1 to 3, each driver 30 is configured to use each function (function different depending on individual difference) when adjusting the light amount. However, when Formula 4.1 is applied, the respective drivers 30 use the common function of FIG. 13B.

Each driver 30 is capable of adjusting the light amount by using the function of the driving current and the average light amount Pone on the basis of, for example, the method of one of the Embodiments 1 to 3. Note that the functions of FIG. 13A, B are the similar kind of the function of FIG. 3, for example. However, as a matter of course, a function similar to the function of FIG. 5 or 12 may be used.

As described above, it is possible to generate a function on the basis of the average light amount Pone easily, and it is possible to adjust the total light amount by using the function with a high degree of accuracy.

The average light amount of each light emitting unit 40 (each driver 30) is described above. However, where there are the separate light source units (light sources) 50 based on the wavelength bands as shown in FIG. 7, the average light amount Pone of each light source 50 may be used. In this case, since there are the light sources 50R, 50G, and 50B of the different wavelength bands, N is at least 3.

9. Timing of Changing Driving Current Value of Driver

For example, there is known a fact that, when each driver 30 (see FIG. 1, etc.) changes the driving current of each light emitting unit 40 for adjusting the light amount, the time period until the driving current is settled is different from each other. In view of this, according to the respective drivers 30 of the light source control apparatus of this embodiment, the timing of starting to switch the driving current of each driver 30 is different from each other.

Specifically, the delay time is set for the switch start timing of the driving current of at least one of the respective drivers 30 such that the settlement completed timing is at the same time. Where the settlement completed timing is at the same time, even if the functions are different depending on the light emitting units 40 as described above, the luminance may be uniform, and especially the white balance may be uniform (may not be deteriorated).

"The same time" may be substantially the same time as long as such an object may be attained.

Basically, the start point of the delay time is designed in two ways. One example of the start point of the delay time is the timing at which each driver 30 receives a command to change the target current value from the controller 20. The other example is the timing at which each driver 30 receives a synchronization signal, the synchronization signal being generated by the controller 20 in order to switch the driving current. The delay time is predetermined when designing the light source control apparatus.

Figure 14B:
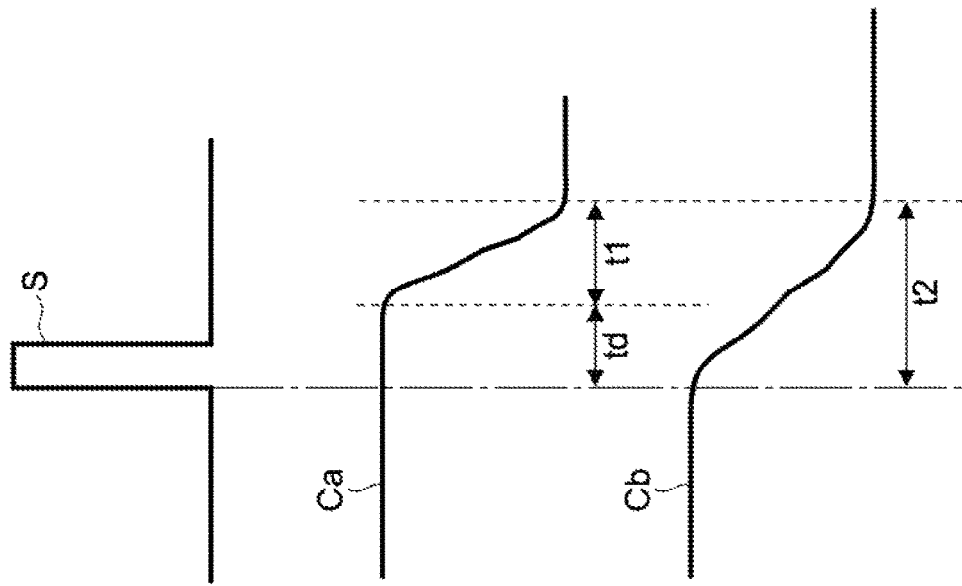
FIG. 14B shows, in this embodiment, an example in which the settlement completed timing is approximately at the same time where the delay time is set.
Figure 14A:
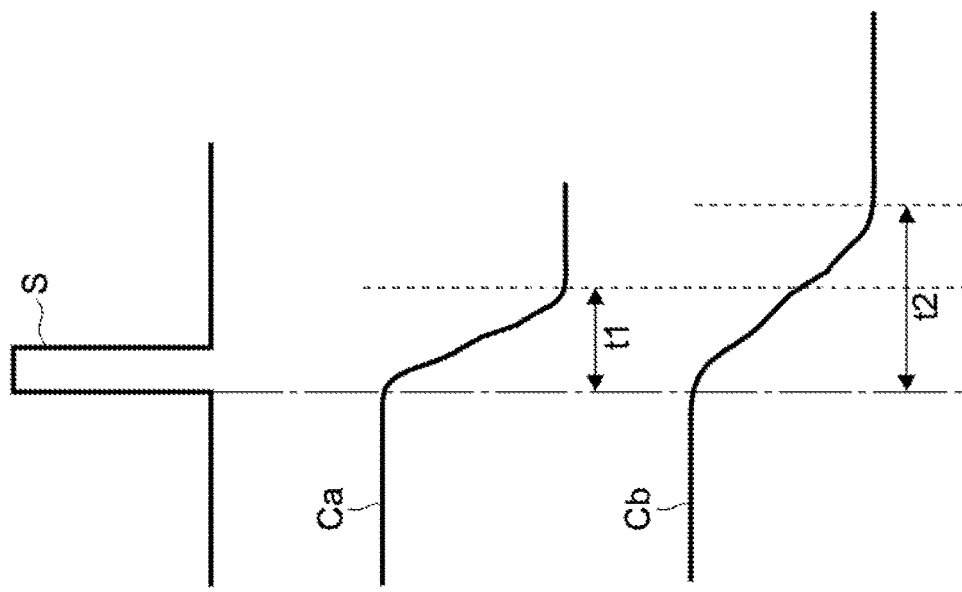
FIG. 14A shows an example in which the driving current is changed (decreased by predetermined current value) to adjust the light amount where no delay time is set (comparative example).

In the latter example (the other example), the controller 20 generates the above-mentioned change command, and then generates the synchronization signal. FIG. 14A shows, as a comparative example, an example in which the driving current is changed (decreased by predetermined current value) to adjust the light amount where no delay time is set. FIG. 14B shows, in this embodiment, an example in which the settlement completed timing is approximately at the same time where the delay time is set. In the examples of FIG. 14A and FIG. 14B, for a better understanding, the synchronization signal (for example, pulse signal) S for switching the driving current is the start point of the delay time. Each driver 30 receives the change command or the synchronization signal S broadcasted from the controller 20.

FIG. 14A shows, from the top in order, the synchronization signal S for switching the driving current, the current waveform Ca of one light emitting unit A, and the current waveform Cb of another light emitting unit B. The current waveform Ca of the light emitting unit A is different from the current waveform Cb of the light emitting unit B in which the time period from receiving the synchronization signal S by each driver to reaching each predetermined current value, i.e., the settling time, is different from each other. The settling time t1 of the light emitting unit A is shorter than the settling time t2 of the light emitting unit B.

In view of this, according to this embodiment, as shown in FIG. 14B, in order to make the settling time approximately the same, the delay time td (=t2−t1) is set, which means that the settling time t2 of the light emitting unit A is realized instead of the settling time t1. For example, where three or more light emitting units 40 are provided, in order to make the settling times of the two or more other light emitting units the same as the latest settling time, each delay time is set for each of the two or more settling times.

The controller 20 transmits each delay time td as a known parameter to each driver 30 before adjusting the light amount (for example, when powering on). Alternatively, each driver 30 prestores factory-configured delay time td. alternatively, each driver 30 may prestore the time to which the delay time is applied (for example, time t1+td). In this case, in principle, the time t2 is different for each driver 30 (for each light emitting unit 40).

By the way, it is assumed that, as the at least three light emitting units 40, RGB three light emitting arrays are used as the light sources 50. Typically, it is assumed that the light sources 50R, 50G, and 50B of FIG. 7 are used as the light sources 50. The settling time of the light source 50R that generates red light is substantially the same as the settling time of the light source 50B that generates blue light. However, the settling time of the light source 50G that generates green light is later (longer) than the settling time of the light sources 50R and 50B. This embodiment has been made to solve this problem, and it is possible to make the settling time the same and to keep the white balance uniform.

According to this embodiment, for example, a plurality of different delay times may be set depending on the change amount before and after switching a driving current (before and after determining driving value). In other words, each driver 30 selectively uses one of a plurality of different switch start timings depending on its change amount. For example, the delay time Ta [ms] may be set where the increased amount is less than Iup [A], and the delay time Tb [ms] may be set where the increased amount is Iup [A] or more. Further, the delay time Tc [ms] may be set where the decreased amount is less than Idown [A], and the delay Td [ms] may be set where the decreased amount is Idown [A] or more, for example. Alternatively, not only two levels as described above but also three or more levels may be set for the change amount.

Note that the present technology may employ the following configurations.

(1)

A light source control apparatus, including:

a controller configured to transmit an instruction value for adjusting a light amount of at least one light emitting unit; and a plurality of drivers, each of the plurality of drivers being configured to obtain the transmitted instruction value, and to determine, by using a function of a driving value for driving the light emitting unit and the light amount, the function being each set for the light emitting unit, the driving value of the light emitting unit each on the basis of the instruction value.

(2)

The light source control apparatus according to the above-mentioned item (1), in which each driver of the plurality of drivers is configured to use, as the function, a function approximated by a straight line.

(3)

The light source control apparatus according to the above-mentioned item (1), in which each driver of the plurality of drivers is configured to use, as the function, a plurality of functions set corresponding to a plurality of driving regions, respectively.

(4)

The light source control apparatus according to the above-mentioned item (2), in which each driver of the plurality of drivers is configured to use, as the function approximated by a straight line, functions approximated by straight lines in a plurality of linear regions set corresponding to a plurality of driving regions, respectively.

(5)

The light source control apparatus according to the above-mentioned item (2) or (4), in which each driver of the plurality of drivers is configured to use the function with known parameters, the known parameters including an inclination of the straight line, a reference light amount, and a reference driving value corresponding to the reference light amount.

(6)

The light source control apparatus according to the above-mentioned item (5), in which each driver of the plurality of drivers is configured to obtain from the controller or prestore a calculated value based on the inclination of the straight line and the reference light amount out of the known parameters.

(7)

The light source control apparatus according to any one of the above-mentioned items (1) to (6), in which the controller is configured to update the function on the basis of a predetermined condition.

(8)
The light source control apparatus according to any one of the above-mentioned items (1) to (7), in which
the controller is configured to broadcast the instruction value to the plurality of drivers.

(9)
The light source control apparatus according to any one of the above-mentioned items (1) to (8), in which
the plurality of drivers include
a plurality of first wavelength band light-emitting drivers, each of the plurality of first wavelength band light-emitting drivers being configured to drive a plurality of light emitting units that emit light having a first wavelength band out of the at least one light emitting unit, and
a plurality of second wavelength band light-emitting drivers, each of the plurality of second wavelength band light-emitting drivers being configured to drive a plurality of light emitting units that emit light having a second wavelength band different from the first wavelength band out of the at least one light emitting unit, and
the controller is configured to transmit a first instruction value to each of the plurality of first wavelength band light-emitting drivers, and to transmit a second instruction value to each of the plurality of first wavelength band light-emitting drivers.

(10)
The light source control apparatus according to any one of the above-mentioned items (1) to (9), in which
the light emitting unit includes a first light emitting unit and a second light emitting unit, and
the plurality of drivers include
a first driver configured to generate a voltage between a reference potential of a reference line and a potential of a first line higher than the reference potential, and to drive the first light emitting unit connected between the reference line and the first line, the first driver being connectable to the reference line and the first line, and
a second driver configured to generate a voltage between the reference potential and a potential of a second line lower than the reference potential, and to drive the second light emitting unit connected between the reference line and the second line, the second driver being connectable to the reference line and the second line.

(11)
The light source control apparatus according to the above-mentioned item (10), in which each of the first driver and the second driver is configured to use a potential of 0 volts as the reference potential.

(12)
The light source control apparatus according to the above-mentioned item (10) or (11), in which
a constant potential is set as the reference potential, and
the second driver is configured to adjust a potential lower than the reference potential to adjust the driving value.

(13)
The light source control apparatus according to the above-mentioned item (12), in which the first driver is configured to adjust a potential higher than the reference potential to adjust the driving value.

(14)
The light source control apparatus according to any one of the above-mentioned items (10) to (13), further including:
a switcher unit that switches connection targets of the first light emitting unit such that an anode of the first light emitting unit is connected to the reference line and a cathode of the first light emitting unit is connected to the second line.

(15)
The light source control apparatus according to any one of the above-mentioned items (10) to (13), further including:
a switcher unit that switches connection targets of the second light emitting unit such that a cathode of the second light emitting unit is connected to the reference line and an anode of the second light emitting unit is connected to the first line.

(16)
The light source control apparatus according to any one of the above-mentioned items (10) to (15), further including:
a resistor element provided on at least one of a line connected to the controller and a line connected to the plurality of drivers out of the reference line.

(17)
The light source control apparatus according to the above-mentioned item (1), in which each driver of the plurality of drivers is configured to use, as the function, a function of an average light amount, the average light amount being obtained by dividing a total light amount of the plurality of light emitting units corresponding to driving values by the number of the light emitting units.

(18)
The light source control apparatus according to the above-mentioned item (1), in which each driver of the plurality of drivers is configured to use switch start timing of the driving value based on the instruction value, the switch start timings of the plurality of drivers being different from each other.

(19)
The light source control apparatus according to the above-mentioned item (18), in which delay time is set for the switch start timing of the driving value of at least one of the respective drivers.

(20)
The light source control apparatus according to the above-mentioned item (19), in which each driver of the plurality of drivers is configured to selectively use the plurality of different switch start timings depending on a change amount of the driving values before and after switching the driving value.

(21)
A light source control method, including:
transmitting, by a controller, an instruction value for adjusting a light amount of at least one light emitting unit;
obtaining, by each of a plurality of drivers, the transmitted instruction value; and
determining, by each of the plurality of drivers, by using a function of a driving value for driving the light emitting unit and the light amount, the function being each set for the light emitting unit, the driving value of the light emitting unit each on the basis of the instruction value.

(22)
The light source control apparatus, including:
a first driver configured to generate a voltage between a reference potential of a reference line and a potential of a first line higher than the reference potential, and to thereby drive the first light emitting unit connected between the reference line and the first line, the first driver being connectable to the reference line and the first line;
a second driver configured to generate a voltage between the reference potential and a potential of a second line lower than the reference potential, and to thereby drive the second light emitting unit connected between the reference line and the second line, the second driver being connectable to the reference line and the second line; and a controller unit connectable to the reference line, the first driver, and the second driver, the controller unit being configured to control the first driver and the second driver.

(23)
The light source control apparatus according to the above-mentioned item (22), in which each of the first driver and the second driver is configured to use a potential of 0 volts as the reference potential.

(24)
The light source control apparatus according to the above-mentioned item (22) or (23), in which
a constant potential is set as the reference potential, and
the second driver is configured to adjust a potential lower than the reference potential to adjust the driving value.

(25)
The light source control apparatus according to the above-mentioned item (24), in which the first driver is configured to adjust a potential higher than the reference potential to adjust the driving value.

(26)
The light source control apparatus according to any one of the above-mentioned items (22) to (25), further including:
a switcher unit that switches connection targets of the first light emitting unit such that an anode of the first light emitting unit is connected to the reference line and a cathode of the first light emitting unit is connected to the second line.

(27)
The light source control apparatus according to any one of the above-mentioned items (22) to (25), further including:
a switcher unit that switches connection targets of the second light emitting unit such that a cathode of the second light emitting unit is connected to the reference line and an anode of the second light emitting unit is connected to the first line.

(28)
The light source control apparatus according to any one of the above-mentioned items (22) to (27), further including:
a resistor element provided on at least one of a line connected to the controller and a line connected to the plurality of drivers out of the reference line.

(29)
A driver unit, including:
a first driver configured to generate a voltage between a reference potential of a reference line and a potential of a first line higher than the reference potential, and to drive the first light emitting unit connected between the reference line and the first line, the first driver being connectable to the reference line and the first line; and
a second driver configured to generate a voltage between the reference potential and a potential of a second line lower than the reference potential, and to drive the second light emitting unit connected between the reference line and the second line, the second driver being connectable to the reference line and the second line.

(30)
A light source unit, including:
a first light emitting unit connected between a reference line and a first line, the first light emitting unit being driven by a current generated by a voltage between a reference potential of the reference line and a potential of the first line higher than the reference potential; and
a second light emitting unit connected between the reference line and a second line, the second light emitting unit being driven by a current generated by a voltage between the reference potential of the reference line and a potential of the second line lower than the reference potential.

(31)
A projector, including:
a plurality of light emitting units;
a light modulation device that modulates light from the plurality of light emitting units;
a projection optical system that projects modulated light obtained by modulating the light by the light modulation device;
a controller configured to transmit an instruction value for adjusting a light amount of at least one light emitting unit; and
a plurality of drivers, each of the plurality of drivers being configured to obtain the transmitted instruction value, and to determine, by using a function of a driving value for driving the light emitting unit and the light amount, the function being each set for the light emitting unit, the driving value of the light emitting unit each on the basis of the instruction value.

(32)
The projector according to the above-mentioned item (31), in which
the plurality of light emitting units include
a first light emitting unit connected between a reference line and a first line, and
a second light emitting unit connected between the reference line and a second line, and
the plurality of drivers include
a first driver configured to generate a voltage between a reference potential of the reference line and a potential of the first line higher than the reference potential, and to drive the first light emitting unit, the first driver being connected to the reference line and the first line, and
a second driver configured to generate a voltage between the reference potential and a potential of a second line lower than the reference potential, and to drive the second light emitting unit, the second driver being connected to the reference line and the second line.

(33)
A projector, including:
a plurality of light emitting units including a first light emitting unit connected between a reference line and a first line, and a second light emitting unit connected between the reference line and a second line;
a light modulation device that modulates light from the plurality of light emitting units;
a projection optical system that projects modulated light obtained by modulating the light by the light modulation device;
a driver unit including a first driver configured to generate a voltage between a reference potential of the reference line and a potential of the first line higher than the reference potential, and to drive the first light emitting unit, the first driver being connected to the reference line and the first line, and a second driver configured to generate a voltage between the reference potential and a potential of a second line lower than the reference potential, and to drive the second light emitting unit, the second driver being connected to the reference line and the second line; and
a controller unit connectable to the reference line, the first driver, and the second driver, the controller unit being configured to control the first driver and the second driver.

REFERENCE SIGNS LIST 20 controller
30 driver
31 first driver
32 second driver
40 light emitting unit 40a first light emitting unit
40b second light emitting unit
42 light emitting device
50, 50R, 50G, 50B, 50A, 50B light source (light source unit)
51 positive supply line
52 negative supply line
59 ground line
101, 102 light source control apparatus
120 controller unit
150 driver unit
210 light modulation device
500 projector

What is claimed is:

1. A light source control apparatus, comprising:
a controller configured to transmit an instruction value to adjust a light amount of at least one light emitting unit; and
a plurality of drivers, wherein each driver of the plurality of drivers is configured to:
obtain the transmitted instruction value;
determine a driving value of each light emitting unit of the at least one light emitting unit, based on the instruction value and a function of the driving value, wherein
the function drives a corresponding light emitting unit of the at least one light emitting unit and the light amount of the at least one light emitting unit, and
the function is set for each light emitting unit of the at least one light emitting unit; and
use, as the function, a plurality of functions set corresponding to a plurality of driving regions, respectively.

2. The light source control apparatus according to claim 1, wherein each driver of the plurality of drivers is further configured to use the function approximated by a straight line.

3. The light source control apparatus according to claim 2, wherein each driver of the plurality of drivers is further configured to use, as the function approximated by the straight line, a plurality of functions approximated by straight lines in a plurality of linear regions set corresponding to the plurality of driving regions, respectively.

4. The light source control apparatus according to claim 2, wherein
each driver of the plurality of drivers is further configured to use the function with parameters, and
the parameters include an inclination of the straight line, a reference light amount, and a reference driving value corresponding to the reference light amount.

5. The light source control apparatus according to claim 4, wherein each driver of the plurality of drivers is further configured to one of obtain from the controller or store a calculated value, based on the inclination of the straight line and the reference light amount.

6. The light source control apparatus according to claim 1, wherein
each driver of the plurality of drivers is further configured to use, as the function, a function of an average light amount, and
the average light amount is obtained based on a division of a total light amount of the at least one light emitting unit corresponding to driving values by a number of light emitting units.

7. A light source control apparatus, comprising:
a controller; and
a plurality of drivers,
wherein the controller is configured to:
transmit an instruction value to adjust a light amount of at least one light emitting unit; and
broadcast the instruction value to the plurality of drivers,
wherein each driver of the plurality of drivers is configured to:
obtain the transmitted instruction value; and
determine a driving value of each light emitting unit of the at least one light emitting unit, based on the instruction value and a function of the driving value, wherein
the function drives a corresponding light emitting unit of the at least one light emitting unit and the light amount of the at least one light emitting unit, and
the function is set for each light emitting unit of the at least one light emitting unit.

8. A light source control apparatus, comprising:
a controller configured to transmit an instruction value to adjust a light amount of at least one light emitting unit;
a plurality of drivers, wherein each driver of the plurality of drivers is configured to:
obtain the transmitted instruction value;
determine a driving value of each light emitting unit of the at least one light emitting unit, based on the instruction value and a function of the driving value, wherein
the function drives a corresponding light emitting unit of the at least one light emitting unit and the light amount of the at least one light emitting unit, and
the function is set for each light emitting unit of the at least one light emitting unit;
a first light emitting unit; and
a second light emitting unit,
wherein the plurality of drivers include:
a first driver configured to:
generate a first voltage between a reference potential of a reference line and a first potential of a first line higher than the reference potential, and
drive the first light emitting unit connected between the reference line and the first line, wherein the first driver is connectable to the reference line and the first line, and
a second driver configured to:
generate a second voltage between the reference potential and a second potential of a second line lower than the reference potential, and
drive the second light emitting unit connected between the reference line and the second line, wherein the second driver is connectable to the reference line and the second line.

9. The light source control apparatus according to claim 8, wherein the first driver and the second driver are further configured to use a third potential of 0 volts as the reference potential.

10. The light source control apparatus according to claim 8, wherein
the second driver is further configured to adjust a third potential lower than the reference potential to adjust the driving value, and
a constant potential is set as the reference potential.

11. The light source control apparatus according to claim 10, wherein the first driver is further configured to adjust the second potential higher than the reference potential to adjust the driving value.

12. The light source control apparatus according to claim 8, further comprising a switcher unit configured to switch connection targets of the first light emitting unit such that an anode of the first light emitting unit is connected to the reference line and a cathode of the first light emitting unit is connected to the second line.

13. The light source control apparatus according to claim 8, further comprising a switcher unit configured to switch connection targets of the second light emitting unit such that a cathode of the second light emitting unit is connected to the reference line and an anode of the second light emitting unit is connected to the first line.

14. The light source control apparatus according to claim 8, further comprising
a resistor element on at least one of the first line connected to the controller or the second line connected to the plurality of drivers, and
wherein the reference line comprises the first line and the second line.

\* \* \* \* \*